(12) United States Patent
Fu

(10) Patent No.: US 12,315,493 B2
(45) Date of Patent: May 27, 2025

(54) AUDIO PROCESSING METHOD, APPARATUS, AND DEVICE, AND STORAGE MEDIUM

(71) Applicant: Tencent Technology (Shenzhen) Company Limited, Shenzhen (CN)

(72) Inventor: Mengxin Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 300 days.

(21) Appl. No.: 17/739,003

(22) Filed: May 6, 2022

(65) Prior Publication Data

US 2022/0262339 A1 Aug. 18, 2022

Related U.S. Application Data

(63) Continuation of application No. PCT/CN2021/098346, filed on Jun. 4, 2021.

(30) Foreign Application Priority Data

Jun. 29, 2020 (CN) .......................... 202010604858.4

(51) Int. Cl.
*G10L 13/08* (2013.01)
*G06F 3/04842* (2022.01)
(Continued)

(52) U.S. Cl.
CPC .......... *G10L 13/08* (2013.01); *G06F 3/04842* (2013.01); *G06F 40/166* (2020.01); *G10L 13/07* (2013.01)

(58) Field of Classification Search
None
See application file for complete search history.

(56) References Cited

U.S. PATENT DOCUMENTS

| 10,691,877 B1* | 6/2020 | Eisner | G06Q 10/101 |
| 2005/0028212 A1* | 2/2005 | Laronne | G06Q 10/00 |

(Continued)

FOREIGN PATENT DOCUMENTS

| CN | 1460245 A | 12/2003 |
| CN | 104240703 A | 12/2014 |
| CN | 209089103 U | 7/2019 |

OTHER PUBLICATIONS

Tencent Technology, WO, PCT/CN2021/098346, Aug. 30, 2021, 3 pgs.

(Continued)

*Primary Examiner* — Quynh H Nguyen
(74) *Attorney, Agent, or Firm* — Morgan, Lewis & Bockius LLP

(57) ABSTRACT

This application relates to an audio processing method, an electronic device, and a storage medium. The method includes: displaying a target audio clip and corresponding target text information having a mapping relationship between a location of an audio segment in the target audio clip and a location of text information in the corresponding target text information; receiving, a selection of a location in the corresponding target text information as a to-be-processed text location; matching a to-be-processed audio location of an audio segment that has the mapping relationship with the to-be-processed text location; and processing the target audio at the to-be-processed audio location to generate an updated target audio clip, and updating the corresponding target text information at the to-be-processed text location to generate updated target text information; and displaying the updated target audio clip and the updated target text information.

20 Claims, 12 Drawing Sheets

(51) Int. Cl.
*G06F 40/166* (2020.01)
*G10L 13/07* (2013.01)

(56) References Cited

U.S. PATENT DOCUMENTS

| | | | | |
|---|---|---|---|---|
| 2006/0106618 A1* | 5/2006 | Racovolis | ............... | G10L 13/08 |
| | | | | 704/277 |
| 2011/0258547 A1* | 10/2011 | Symons | ............... | G06F 3/0486 |
| | | | | 715/723 |
| 2014/0006937 A1* | 1/2014 | Rainisto | ............... | G06F 40/103 |
| | | | | 715/255 |
| 2018/0286459 A1 | 10/2018 | Lenovo | | |

OTHER PUBLICATIONS

Tencent Technology, IPRP, PCT/CN2021/098346, Dec. 13, 2022, 4 pgs.
Tencent Technology, ISR, PCT/CN2021/098346, Aug. 30, 2021, 2 pgs.

* cited by examiner

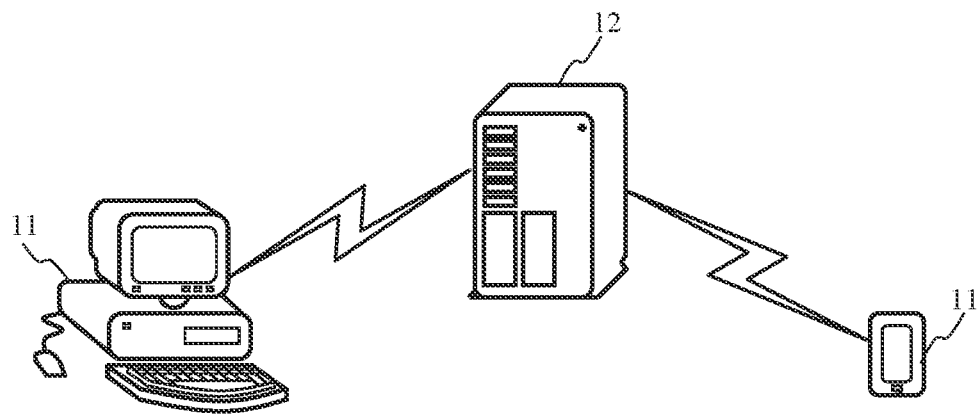

FIG. 1

| Display target audio and target text information corresponding to the target audio, a mapping relationship existing between a location of an audio segment in the target audio in the target audio and a location of text information in the target text information in the target text information | 201 |

| Use, as a to-be-processed text location, a location of text information that is in the target text information and that matches a location selection instruction, and use, as a to-be-processed audio location, a location of an audio segment that has the mapping relationship with the to-be-processed text location | 202 |

| Process the target audio according to the to-be-processed audio location, and process the target text information according to the to-be-processed text location, so as to update the displayed target audio and target text information | 203 |

FIG. 2A

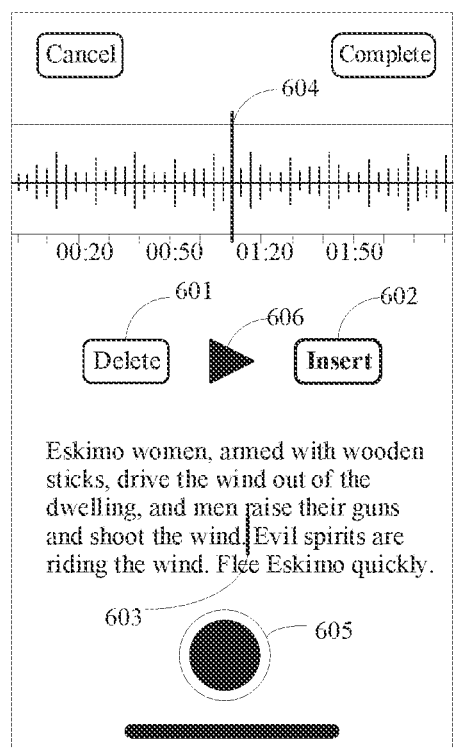
(1)
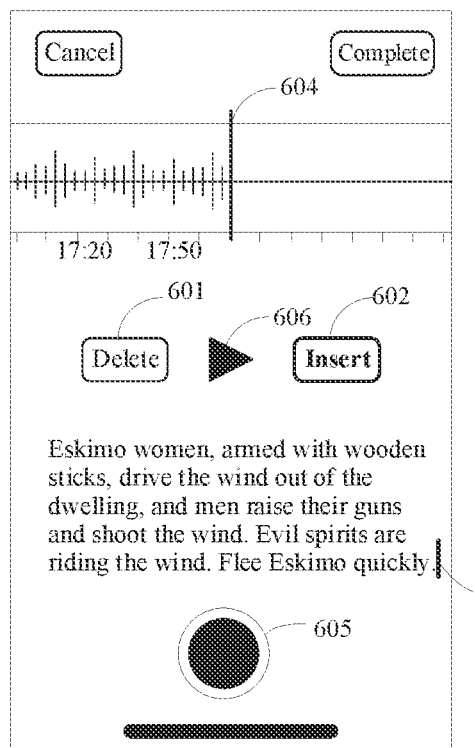
(2)
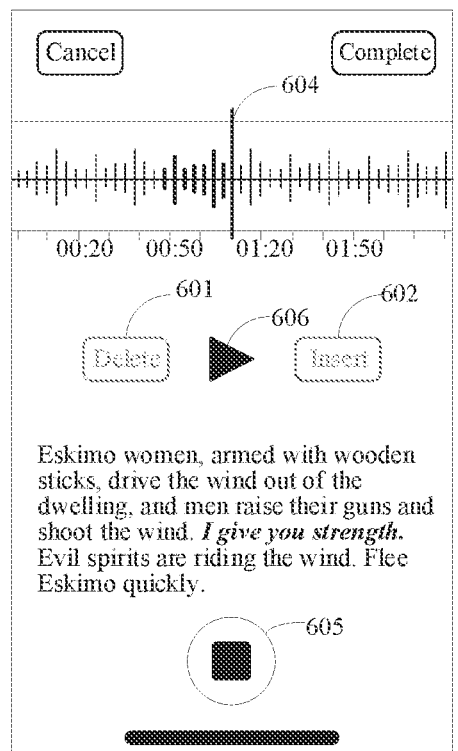
(3)
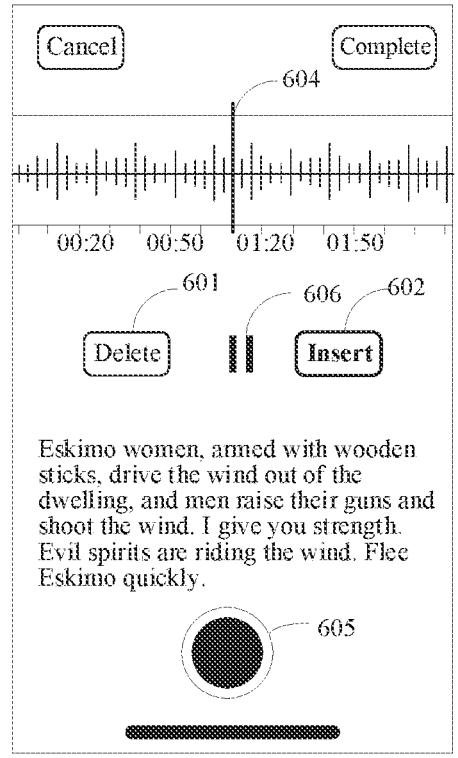
(4)
FIG. 6

AUDIO PROCESSING METHOD, APPARATUS, AND DEVICE, AND STORAGE MEDIUM

CROSS-REFERENCE TO RELATED APPLICATIONS

This application is a continuation application of PCT Patent Application No. PCT/CN2021/098346, entitled "AUDIO PROCESSING METHOD AND APPARATUS, DEVICE, AND STORAGE MEDIUM" filed on Jun. 4, 2021, which claims priority to Chinese Patent Application No. 202010604858.4, filed with the State Intellectual Property Office of the People's Republic of China on Jun. 29, 2020, and entitled "AUDIO PROCESSING METHOD, APPARATUS, AND DEVICE, AND STORAGE MEDIUM", all of which are incorporated herein by reference in their entirety.

FIELD OF THE TECHNOLOGY

Embodiments of this application relate to the field of computer technologies, and in particular, to an audio processing method, apparatus, and device, and a storage medium.

BACKGROUND OF THE DISCLOSURE

With development of computer technologies, more and more application programs or web pages support processing of existing audio to obtain more suitable audio. For example, an audio segment corresponding to a location is deleted from audio, or a new audio segment is inserted at a location in the audio.

In a process of processing the audio in a related technology, a user first determines a to-be-processed location in the audio by listening to the audio, and then performs corresponding processing on the to-be-processed location in the audio according to a processing instruction of the user, for example, inserting a new audio segment at the to-be-processed location, or deleting an audio segment corresponding to the to-be-processed location.

SUMMARY

An embodiment of this application provides an audio processing method, including:
  displaying target audio clip and corresponding target text information having a mapping relationship between a location of an audio segment in the target audio clip and a location of text information in the corresponding target text information;
  receiving a selection of a location in the corresponding target text information as a to-be-processed text location;
  matching a to-be-processed audio location of an audio segment that has the mapping relationship with the to-be-processed text location; and
  processing the target audio at the to-be-processed audio location to generate an updated target audio clip, and updating the corresponding target text information at the to-be-processed text location to generate updated target text information, and
  displaying the updated target audio clip and the updated target text information.

An embodiment of this application provides an audio processing apparatus, including:
  a display module, configured to display target audio and target text information corresponding to the target audio, a mapping relationship existing between a location of an audio segment in the target audio in the target audio and a location of text information in the target text information in the target text information;
  a determining module, configured to: use, as a to-be-processed text location, a location of text information that is in the target text information and that matches a location selection instruction, and use, as a to-be-processed audio location, a location of an audio segment that has the mapping relationship with the to-be-processed text location; and
  a processing module, configured to process the target audio according to the to-be-processed audio location, and process the target text information according to the to-be-processed text location, so as to update the displayed target audio and target text information.

An embodiment of this application provides a computer device, including a processor and a memory, the memory storing at least one segment of program code, and the at least one segment of program code being loaded and executed by the processor to implement the foregoing audio processing method.

An embodiment of this application further provides a computer readable storage medium, storing at least one segment of program code, and the at least one segment of program code being loaded and executed by a processor to implement the foregoing audio processing method.

An embodiment of this application provides a computer program product or a computer program. The computer program product or the computer program includes computer instructions, and the computer instructions are stored in a computer readable storage medium. A processor of a computer device reads the computer instruction from the computer readable storage medium, and the processor executes the computer instruction, so that the computer device performs the foregoing audio processing method.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other accompanying drawings from these accompanying drawings without creative efforts.

FIG. 1 is a schematic diagram of an implementation environment of an audio processing method according to an embodiment of this application.

FIG. 2A is a flowchart of an audio processing method according to an embodiment of this application.

FIG. 6 is a schematic diagram of a display page according to an embodiment of this application.

DESCRIPTION OF EMBODIMENTS

Figure 2B:
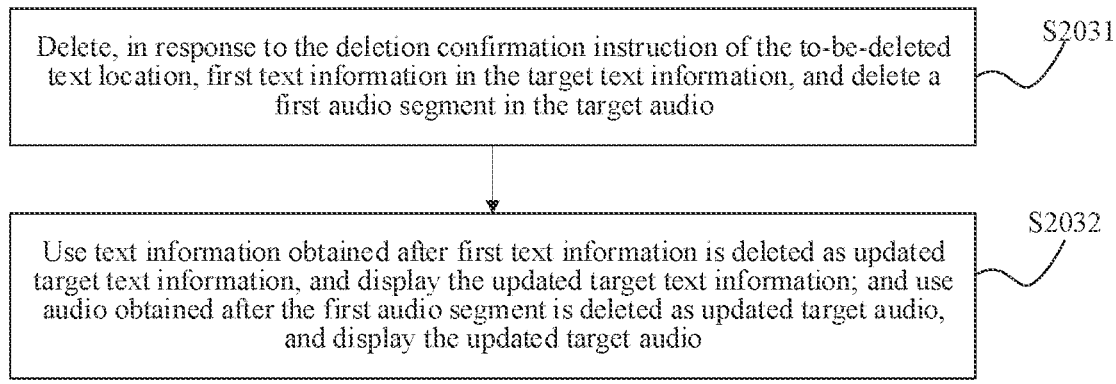
FIG. 2B is a flowchart of an example implementation process of step 203 according to an embodiment of this application.

To make objectives, technical solutions, and advantages of this application clearer, the following further describes in detail implementations of this application with reference to the accompanying drawings.

The terms such as "first" and "second" in the specification and the claims of this application are intended to distinguish between similar objects, but are not necessarily used for describing a specific sequence or a chronological order. It is to be understood that the data termed in such a way is interchangeable in proper circumstances, so that the embodiments of this application described herein can be implemented in other sequences than the sequence illustrated or described herein. The implementations described in the following exemplary embodiments do not represent all implementations that are consistent with this application. On the contrary, the implementations are merely examples of devices and methods that are described in detail in the appended claims and that are consistent with some aspects of this application.

With development of computer technologies, more and more application programs or web pages support processing of existing audio to obtain more suitable audio. For example, an audio segment corresponding to a location is deleted from audio, or a new audio segment is inserted at a location in the audio.

In this audio processing process, a to-be-processed location is determined by a user by listening to the audio, and when audio recognition is relatively low, it is difficult to accurately determine the to-be-processed location after listening to the audio for a few times. Therefore, the user usually needs to repeatedly listen to the audio to determine a relatively accurate to-be-processed location. This audio processing process is time- and labor-consuming, and audio processing efficiency is relatively low, which causes a poor audio processing effect. For this reason, an embodiment of this application provides an audio processing method, which can improve audio processing efficiency. Referring to FIG. 1, FIG. 1 is a schematic diagram of an implementation environment of an audio processing method according to an embodiment of this application. The implementation environment includes a terminal 11 and a server 12.

An application program or a web page with an audio processing function is installed on the terminal 11. When audio in the application program or the web page needs to be processed, the method provided in this embodiment of this application may be used for processing. The terminal 11 can display audio information that needs to be processed and text information corresponding to the audio information, so as to determine, according to the text information, an audio location that needs to be processed, and further processes the audio information according to the audio location that needs to be processed. The audio information may also be referred to as audio. The server 12 may store the audio that needs to be processed, or may convert the audio into text information. The server 12 may further send the audio and the text information corresponding to the audio to the terminal 11. The terminal 11 visually displays the audio and the text information corresponding to the audio. Certainly, the terminal 11 may also store the audio and the text information corresponding to the audio, so as to visually display the stored audio and text information corresponding to the audio.

In a possible implementation, the terminal 11 is any electronic product that can interact with a user by using one or more manners such as a keyboard, a touchpad, a touchscreen, a remote control, voice interaction, or a handwriting device, for example, a personal computer (PC), a mobile phone, a smartphone, a personal digital assistant (PDA), a wearable device, a pocket PC (PPC), a tablet computer, a smart vehicle system, a smart TV, and a smart box. The server 12 may either be one server, or a server cluster including a plurality of servers, or a cloud computing service center. The terminal 11 and the server 12 establish a communication connection through a wired or wireless network.

A person skilled in the art is to understand that the terminal 11 and server 12 are only examples, and other existing or potential terminals or servers that are applicable to this application are also to be included in the scope of protection of this application, and are included herein by reference.

Based on the foregoing implementation environment shown in FIG. 1, an embodiment of this application provides an audio processing method, and the method is applied to the terminal 11 as an example. As shown in FIG. 2A, the method provided in this embodiment of this application includes the following steps:

Step 201: Display target audio and target text information corresponding to the target audio, a mapping relationship existing between a location of an audio segment in the target audio in the target audio and a location of text information in the target text information in the target text information.

The target audio is any audio that needs to be processed. A type of the target audio is not limited in this embodiment of this application. For example, the target audio is recorded voice audio, or the target audio is recorded song audio. Displaying the target audio means showing a ripple of the target audio, which may also be referred to as showing the target audio below.

Before step 201 is performed, a processing request of the target audio needs to be first obtained. In a possible implementation, according to different sources of the target audio, a process of acquiring the processing request of the target audio includes but is not limited to the following two cases:

Case 1: At least one candidate audio is displayed on an audio selection page, and each candidate audio is corresponding to a processing control. When it is detected that a processing control of any candidate audio is triggered, the candidate audio is used as the target audio. In this case, the processing request of the target audio is obtained.

Case 1 occurs when the target audio comes from at least one candidate audio pre-stored. In case 1, each candidate audio displayed on the audio selection page corresponds to a processing control. The processing control is used for guiding an interaction object to perform a processing process on the candidate audio.

When it is detected that any candidate audio processing control is triggered, it indicates that the interaction object wants to process the candidate audio. In this case, the candidate audio whose processing control is triggered is used as the target audio, and the terminal obtains the processing request of the target audio.

In a possible implementation, in addition to a corresponding processing control, each candidate audio displayed on the audio selection page further has a corresponding playback control. The playback control is used for controlling starting and stopping playback of the candidate audio. When it is detected that a playback control of any candidate audio is triggered, the candidate audio is played; and in a process of playing the candidate audio, if it is detected that the playback control is triggered again, playback of the candidate audio is stopped. In an example embodiment, the playback control has different representation forms in a playback process and in a non-playback process, so as to facilitate distinguishing between the playback process and the non-playback process.

The candidate audio is displayed in the audio selection page in a specified form for the interaction object to select. The specified form may refer to displaying by using an audio identifier. The audio identifier refers to an audio title, an audio picture, and the like. In a possible implementation, the candidate audio may refer to audio for which the interaction object has a processing permission, so as to ensure reliability of an audio processing process. For example, the candidate audio is audio recorded historically by the interaction object.

Case 2: A processing control is displayed on an audio recording page. If it is detected that the processing control is triggered, audio recorded on the audio recording page is used as the target audio. In this case, the processing request of the target audio is obtained.

Case 2 occurs when the target audio comes from audio recorded in real time. On the audio recording page, the interaction object can record audio in real time. The processing control is displayed on the audio recording page, where the processing control is used for guiding the interaction object to perform a processing process on the audio recorded in real time. When it is detected that the processing control is triggered, it indicates that the interaction object wants to process the audio recorded in real time. In this case, the audio recorded on the audio recording page is used as the target audio, and the terminal obtains the processing request of the target audio.

In a possible implementation, an audio recording control is displayed on the audio recording page, and the audio recording control is used for controlling a recording process of the audio. When a trigger operation of the audio recording control is detected, audio of the interaction object starts to be recorded; and when a trigger operation of the audio recording control is detected again, recording stops. By analogy, an odd quantity of trigger operations is corresponding to continuing the recording process, and an even quantity of trigger operations is corresponding to stopping the recording process. The audio recording control in the recording process and the audio recording control in a non-recording process may have different representation forms, so that the recording process and the non-recording process are visually distinguished.

In a possible implementation, the processing control is not displayed in the recording process or is set to a non-triggerable state, so as to disable triggering of the processing control in the recording process, thereby avoiding unnecessary interference to the recording process.

In a possible implementation, when the audio recording page displays the processing control, a confirmation completion control may be further displayed, and the confirmation completion control is used for ending the recording process. When a trigger operation of the confirmation completion control is detected, it indicates that the recording process ends and that the interaction object does not currently need to process the recorded audio. In this case, the terminal stores the recorded audio, or sends the recorded audio to the server for storage, so as to implement subsequent playback or processing operations on the recorded audio. In a possible implementation, similar to the processing control, the confirmation completion control is not displayed in the recording process or is set to a non-triggerable state, so as to disable triggering of the confirmation completion control in the recording process, thereby avoiding unnecessary interference to the recording process.

Figure 3:
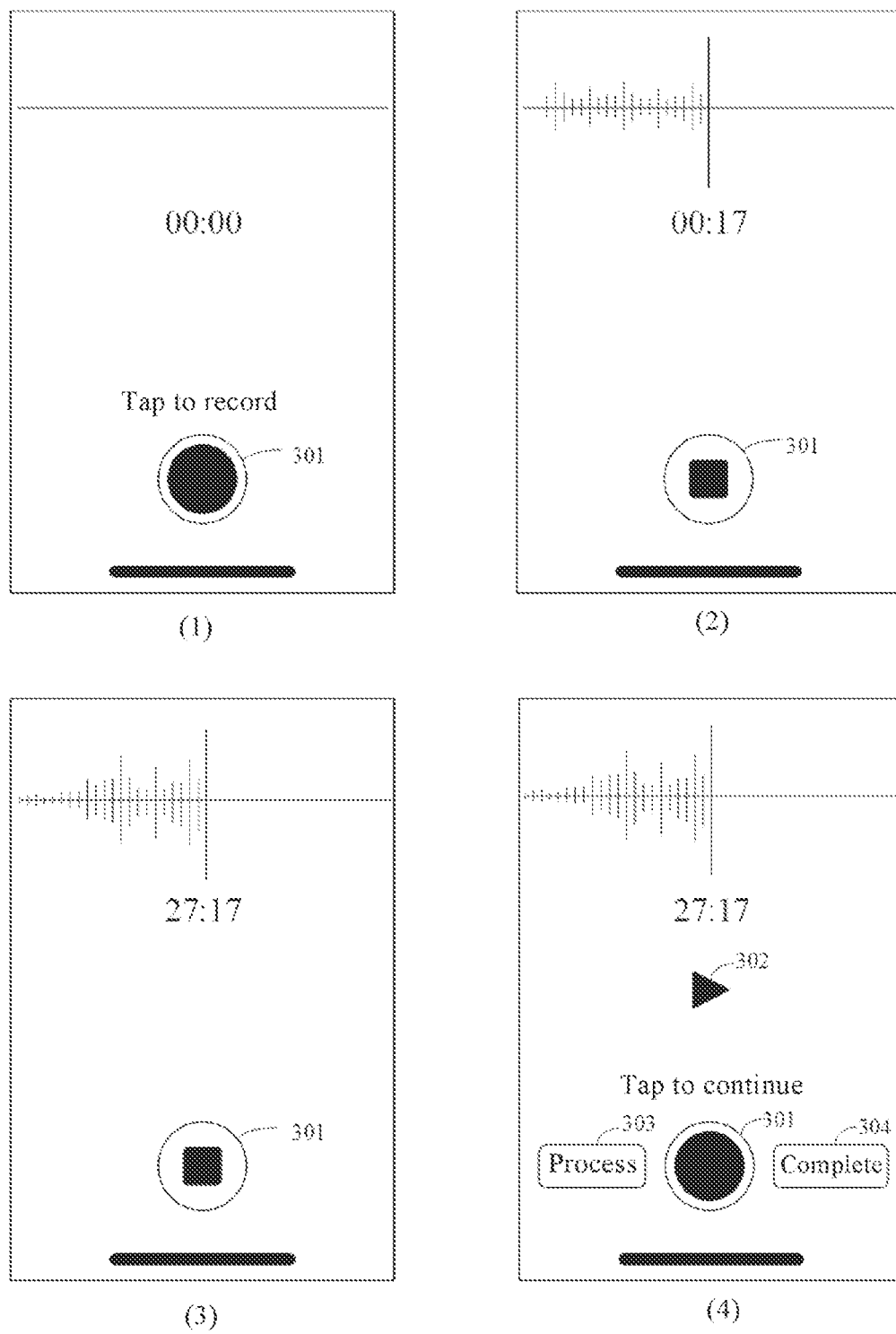
FIG. 3 is a schematic diagram of a display page according to an embodiment of this application.

For example, a display page in the audio recording process is shown in FIG. 3. The interaction object opens an application program that has an audio recording function, and enters an audio recording page in the application program. The audio recording page before recording is shown in (1) of FIG. 3. In (1) of FIG. 3, an audio recording control 301 is displayed. In this case, the audio recording control has a first representation form, and the first representation form is a representation form of the audio recording control in a non-recording process. When the interaction object triggers the audio recording control 301 in (1) of FIG. 3, the terminal detects a trigger operation of the audio recording control, and starts recording audio of the interaction object. In a process of recording the audio of the interaction object, as shown in the audio recording control 301 displayed in (2) of FIG. 3, the audio recording control has a second representation form, and the second presentation form is a representation form of the audio recording control in a recording process.

As the recording process progresses, ripples of recorded audio are displayed on the audio recording page. (2) in FIG. 3 is a display page when recording duration is 17 seconds. A ripple at a locating pointer indicates a ripple at a current recording moment. As recording time is prolonged, recorded ripples move from right to left. In the recording process, a progress bar of the ripples is immovable, and the locating pointer always corresponds to a ripple of audio recorded at a current recording moment, so as to avoid interference to the recording process. A display page when the recording duration is 27 minutes and 17 seconds is shown in (3) of FIG. 3. If the recording process needs to be terminated or suspended, the interaction object may trigger the audio recording control in the second representation form. When the interaction object triggers the audio recording control with the second representation, as shown in (4) of FIG. 3, the audio recording control 301 returns to the first representation form.

As shown in (4) of FIG. 3, a playback control 302 is displayed on the audio recording page. The playback control 302 is used for triggering starting and stopping playback of the recorded audio. After starting playback of the playback control 302 is triggered, if playback is not stopped, the terminal cyclically plays the recorded audio. The audio recording page further displays a processing control 303 and a confirmation completion control 304. When the interaction object triggers the processing control 303, the terminal detects that the processing control is triggered, and uses the audio recorded on the audio recording page as the target audio. In this case, the terminal obtains the processing request of the target audio. When the interaction object triggers the confirmation completion control 304, the terminal detects that the confirmation completion control is triggered, and locally stores the audio recorded on the audio recording page or sends the audio recorded on the audio recording page to the server for storage.

As shown in FIG. 3, in the display page in the audio recording process, total duration of the recorded audio is displayed, so as to facilitate viewing by the interaction object. In an example embodiment, ripples in the non-recording process and ripples in the recording process are displayed in different colors, so as to distinguish between the different recording process and non-recording process. For example, the ripples in the recording process are displayed in green, and the ripples in the non-recording process are displayed in white. In addition, locating pointers in the recording process and the non-recording process may also be displayed in different colors. For example, the locating pointer in the recording process is displayed in green, and the locating pointer in the non-recording process is displayed in blue. In the non-recording process, the ripples of the audio are dragged to adjust a playback progress of the audio.

When the target audio comes from pre-stored candidate audio, the candidate audio is also obtained by means of recording. A recording process of the candidate audio is similar to the foregoing recording process, and details are not described herein again.

In either case, after the processing request of the target audio is obtained, the target audio and the target text information corresponding to the target audio are displayed based on the processing request of the target audio. Before displaying the target audio and the target text information corresponding to the target audio, the terminal needs to first obtain the target audio and the target text information corresponding to the target audio. The following describes a process of obtaining the target audio and the target text information corresponding to the target audio.

When the target audio is any candidate audio, the target audio may be stored in the terminal, or may be stored in the server. When the target audio is audio recorded in real time, the target audio is stored in the terminal.

For the case in which the target audio is stored in the terminal, manners in which the terminal acquires the target audio and the text information corresponding to the target audio include but are not limited to the following two manners:
1. The terminal locally extracts the target audio based on the processing request of the target audio. The terminal performs text conversion processing on the target audio to obtain the target text information corresponding to the target audio.
2. The terminal locally extracts the target audio based on the processing request of the target audio. The terminal sends the target audio to the server, and the server performs text conversion processing on the target audio to obtain the target text information corresponding to the target audio. The terminal receives the target text information corresponding to the target audio sent by the server.

In the case in which the target audio is stored in the server, manners in which the terminal acquires the target audio and the text information corresponding to the target audio include but are not limited to the following two manners:
1. The terminal sends an acquiring request for the target audio to the server based on the processing request of the target audio. The terminal receives the target audio sent by the server. The terminal performs text conversion processing on the received target audio to obtain the target text information corresponding to the target audio.
2. The terminal sends, based on the processing request of the target audio, an acquiring request for the target audio and the target text information corresponding to the target audio to the server, so that the server performs text conversion processing on the target audio and obtains the target text information corresponding to the target audio, or the server extracts pre-stored target audio and the target text information corresponding to the target audio. The terminal receives the target audio and the target text information corresponding to the target audio that are sent by the server.

That is, the target text information is obtained by performing text conversion processing on the target audio. A process of performing text conversion processing on the target audio may be performed by the server, or may be performed by the terminal. Regardless of whether the processing is performed by the server or by the terminal, a text conversion processing process of the target audio can be implemented by using an audio-to-text conversion technology. In this embodiment of this application, the audio-to-text conversion technology is not limited.

In a possible implementation, in addition to acquiring the target audio and the target text information corresponding to the target audio, a mapping relationship between a location of an audio segment in the target audio and a location of text information in the target text information needs to be obtained, so that after a to-be-processed text location is determined according to the target text information, a to-be-processed audio location is quickly determined according to the mapping relationship. The mapping relationship between a location of an audio segment in the target audio and a location of text information in the target text information is used for indicating a correspondence between a location of an audio segment in the target audio and a location of text information in the target text information.

The location of the audio segment in the target audio may be a location of an audio ripple at a timestamp, or may be a location of an audio segment corresponding to a time range. This is not limited in this embodiment of this application. The target text information includes a spacing between text. The location of the text information in the target text information may refer to a location of a spacing, or may refer to a location of text information formed by at least one piece of text and at least one spacing. A location of each audio segment in the target audio exists at a location of corresponding text information, and a location of each piece of text information in the target text information also exists at a location of a corresponding audio segment.

In a possible implementation, a manner in which the terminal acquires the mapping relationship between a location of an audio segment in the target audio and a location of text information in the target text information is as follows: The terminal determines, based on the target audio and the target text information, the mapping relationship between a location of an audio segment in the target audio and a location of text information in the target text information. In a possible implementation, an implementation of this process is as follows: aligning, according to timestamp information, the location of the audio segment in the target audio with the location of the text information in the target text information, and recording the mapping relationship between the location of the audio segment in the target audio and the location of the text information in the target text information by using the timestamp information, the location of the audio segment in the target audio, and the location of the text information in the target text information. The timestamp information may be a moment corresponding to one timestamp, or may be a time range formed by two timestamps. This is not limited in this embodiment of this application.

Any audio segment and text information converted from the audio segment have the same timestamp information. The location of the audio segment in the target audio can be aligned with the location of the text information in the target text information according to the timestamp information, so as to obtain a correspondence among the timestamp information, the location of the audio segment in the target audio, and the location of the text information in the target text information, and obtain the mapping relationship between the location of the audio segment in the target audio and the location of the text information in the target text information according to the correspondence among the timestamp information, the location of the audio segment in the target audio, and the location of the text information in the target text information.

In a possible implementation, when the target text information corresponding to the target audio is acquired by the server, after acquiring the target text information, the server can further mark, at a corresponding timestamp of the target audio, text information corresponding to each audio segment according to the target text information, so that the marked target audio carries the mapping relationship between the location of the audio segment in the target audio and the location of the text information in the target text information. Then the server sends the target text information and the marked target audio to the terminal. In this case, a manner in which the terminal acquires the mapping relationship between the location of the audio segment in the target audio and the location of the text information in the target text information is as follows: The terminal parses out the mapping relationship between the location of the audio segment in the target audio and the location of the text information in the target text information from the marked target audio.

One audio segment is corresponding to one segment of text information. One segment of text information may include at least one character, or may include only an empty character. This is not limited in this embodiment of this application. For example, text information corresponding to an audio segment whose recording volume is lower than a volume threshold includes only an empty character. The volume threshold is set according to experience or flexibly adjusted according to an application scenario, which is not limited in this embodiment of this application.

After the target audio and the target text information corresponding to the target audio are acquired, the target audio and the target text information corresponding to the target audio are displayed. A display manner of the target audio is not limited in this embodiment of this application. For example, the terminal displays the target audio by displaying the ripple of the target audio. The ripple of the target audio includes lines of different heights, and the height of the line is used for indicating a volume of audio at a moment corresponding to the line. The ripple of the target audio can enable the interaction object to more intuitively learn of the change of the audio volume of the target audio. For example, when the target audio is displayed, a timestamp corresponding to a line constituting the ripple may be further displayed. The timestamp is used for indicating a playback timestamp corresponding to the line in the entire target audio.

In this embodiment of this application, a layout of the target audio and the target text information on the display page is also not limited. For example, the target audio is displayed in an upper region of the display page, and the target text information is displayed in a lower region of the display page. When the duration of the target audio is relatively long, the display page may display only partial audio and partial text information, and the interaction object may adjust, by moving the audio or the text information, the audio or the text information displayed on the display page.

Figure 4:
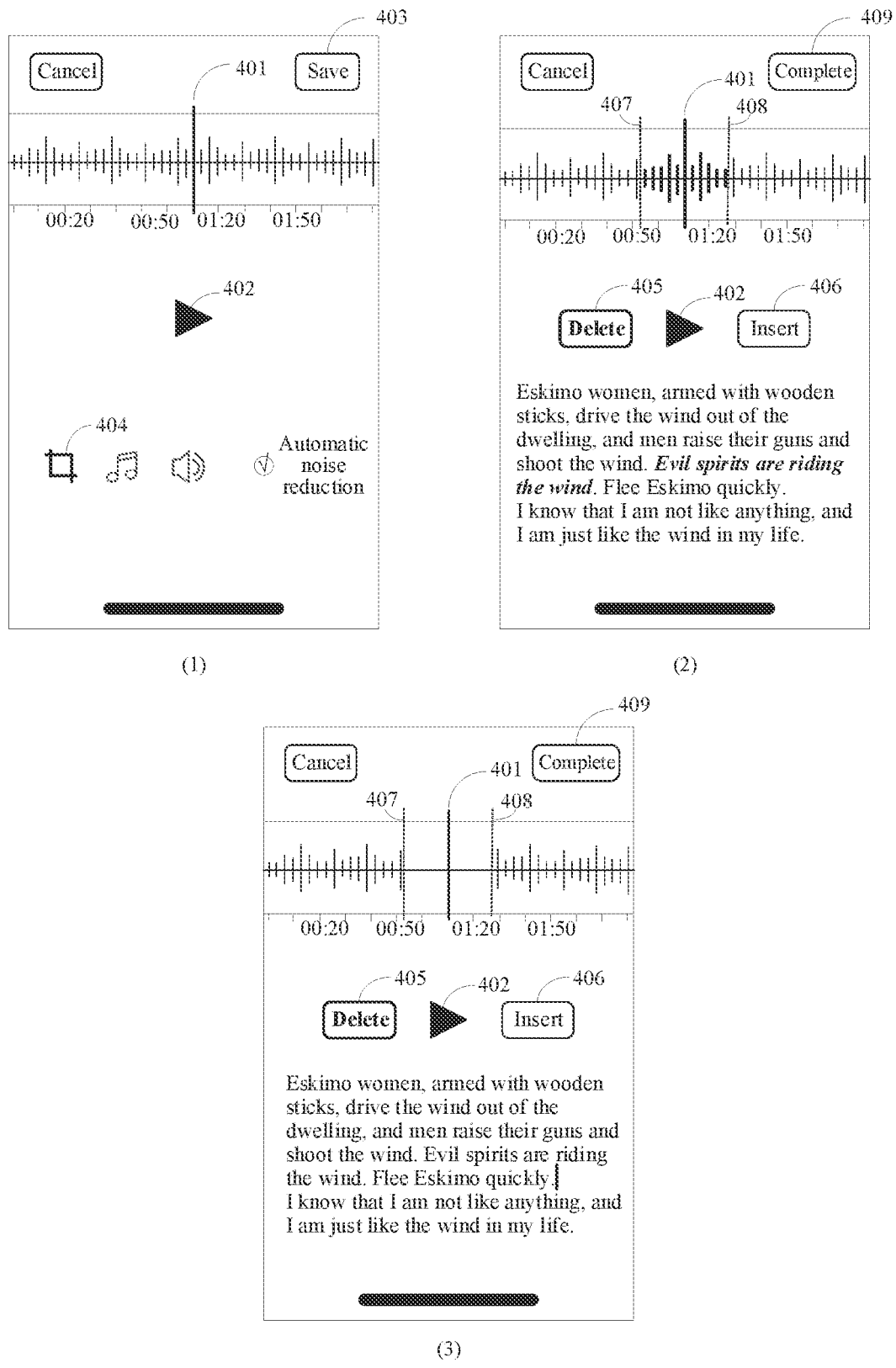
FIG. 4 is a schematic diagram of a display page according to an embodiment of this application.

In a possible implementation, before the target audio and the target text information are displayed, an audio preprocessing page is first displayed. The target audio and the target text information are displayed in response to that a processing control on the audio preprocessing page is triggered. As shown in FIG. 4, (1) in FIG. 4 is an audio preprocessing page. In the audio preprocessing page, the target audio is displayed in a ripple form, and a locating pointer 401 is displayed at a middle location of the ripple display region of the target audio. The location of the locating pointer 401 is not movable, and is used for locating a currently playing audio location.

In (1) of FIG. 4, a timestamp is further correspondingly displayed below the ripple of the target audio, and the timestamp is used for identifying a corresponding playback timestamp of the ripple in the entire target audio. The audio preprocessing page displays a playback control 402, which is used for controlling playback of the target audio. When the target audio is audio recorded in real time, in the audio preprocessing page, an initial state of the ripple of the target audio is a state in which recording ends, and the ripple of the target audio may be dragged to adjust a playback progress. In (1) of FIG. 4, an automatic noise reduction option is selected by default, and automatic noise reduction processing can be performed on the target audio, so as to improve quality of the target audio. In (1) of FIG. 4, a save control 403 is further displayed. If the interaction object triggers the save control 403 on the audio preprocessing page, it indicates that no subsequent processing is required, and the terminal locally stores the target audio or sends the target audio to the server for storage.

In (1) of FIG. 4, the audio preprocessing page further displays a processing control 404. In response to that the processing control 404 is triggered, the audio preprocessing page jumps to a display page shown in (2) of FIG. 4, and displays the target audio and the target text information corresponding to the target audio on the display page shown in (2) of FIG. 4.

Figure 5:
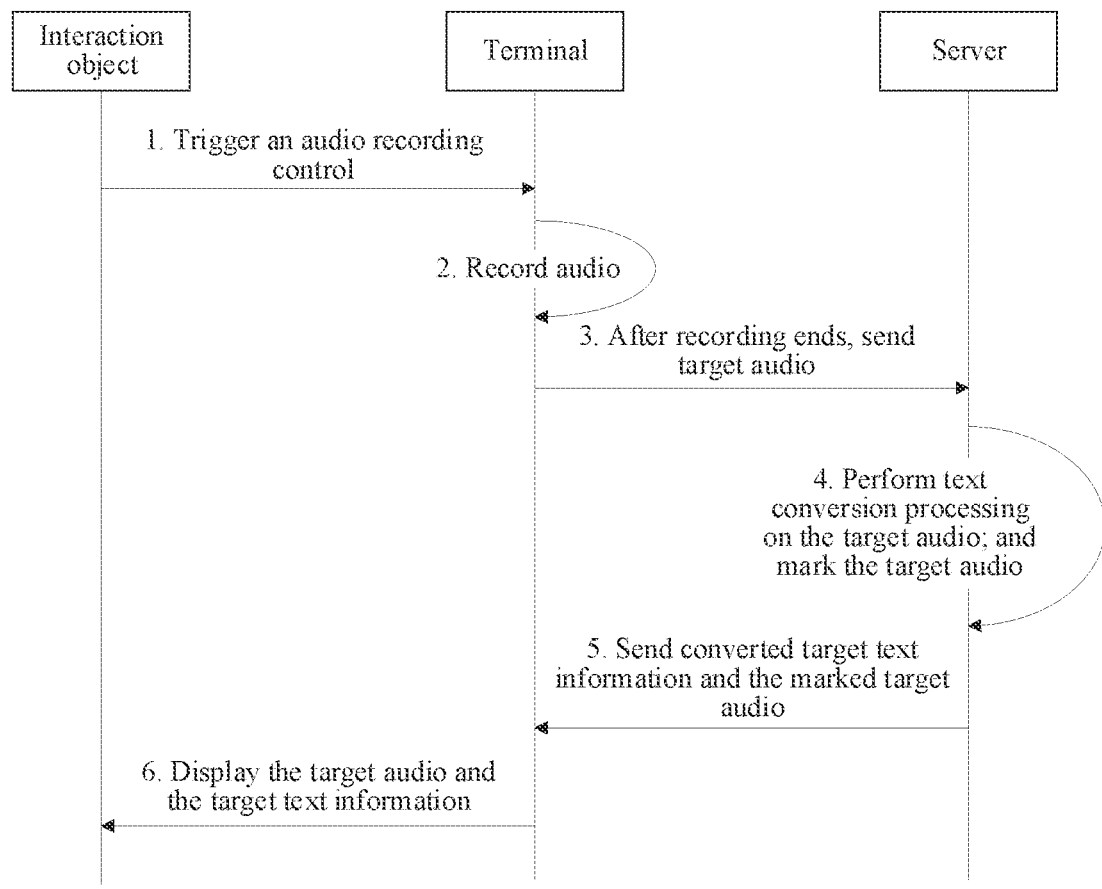
FIG. 5 is an interaction flowchart of an interaction object, a terminal, and a server in a process of displaying target audio and target text information according to an embodiment of this application.

For example, in a process of displaying the target audio and the target text information, an interaction flowchart of the interaction object, the terminal, and the server is shown in FIG. 5, and includes the following steps:
1. The interaction object triggers the audio recording control and inputs audio.
2. The terminal records the audio of the interaction object.
3. After recording ends, the terminal sends the recorded target audio to the server.

4. After receiving the target audio, the server performs text conversion processing on the target audio, and marks at a corresponding timestamp of the target audio according to converted text information, to obtain a mapping relationship between a location of an audio segment in the target audio and a location of text information in the target text information.
5. The server sends the converted target text information and the marked target audio to the terminal.
6. The terminal displays (shows) the target audio and the target text information.

Step 202: Use, as a to-be-processed text location, a location of text information that is in the target text information and that matches a location selection instruction, and use, as a to-be-processed audio location, a location of an audio segment that has the mapping relationship with the to-be-processed text location.

After the target audio and the target text information are displayed, the interaction object can process the target audio. A task for processing the target audio may be divided into two processes. The first process is to determine the to-be-processed audio location. The second process is to perform a processing operation on the to-be-processed audio location. A process of determining the to-be-processed audio location is described in step 202, and a process of performing the processing operation on the to-be-processed audio location is described in step 203.

In the process of determining the to-be-processed audio location, because the target text information has a higher recognition degree than the target audio, the interaction object can determine, by quickly identifying the text information in the target text information, a location of text information that needs to be processed. Because there is a mapping relationship between a location of text information in the target text information and a location of an audio segment in the target audio, after determining the to-be-processed text location, the to-be-processed audio location can be quickly determined. In this embodiment of this application, the to-be-processed text location is first determined, and then the to-be-processed audio location is determined according to the to-be-processed text location, which can improve accuracy and efficiency of determining the to-be-processed audio location, and further improve an audio processing effect.

In this embodiment of this application, the process of determining the to-be-processed text location and the to-be-processed audio location is as follows: Use, in response to a location selection instruction corresponding to the target text information as a to-be-processed text location, a location of text information that is in the target text information and that matches a location selection instruction, and use, as a to-be-processed audio location, a location of an audio segment that has the mapping relationship with the to-be-processed text location.

Before the location of the audio segment that has the mapping relationship with the to-be-processed text location is used as the to-be-processed audio location, the location of the audio segment that has the mapping relationship with the to-be-processed text location needs to be first determined. In a possible implementation, a manner of determining the location of the audio segment that has the mapping relationship with the to-be-processed text location is: searching the mapping relationship for timestamp information corresponding to the to-be-processed text location, then determining an audio segment that is in the target audio and corresponding to the timestamp information, and using a location of the audio segment as the location of the audio segment that has the mapping relationship with the to-be-processed text location.

In a possible implementation, when the target audio is displayed, a timestamp corresponding to the target audio is displayed, so that the to-be-processed audio location is quickly located according to the displayed timestamp. In a possible implementation, when the timestamp includes a mapping relationship mark, a correspondence between a text location and an audio location may be quickly queried according to the mark, so as to quickly determine the location of the audio segment that has the mapping relationship with the to-be-processed text location.

In a possible implementation, the location selection instruction includes a deletion selection instruction or an insertion selection instruction. The deletion selection instruction is used for determining a to-be-deleted location, and the insertion selection instruction is used for determining a to-be-inserted location. Next, two cases are separately described:

Case 1: The location selection instruction includes a deletion selection instruction.

When the location selection instruction includes the deletion selection instruction, an implementation process of using, as a to-be-processed text location in response to the location selection instruction for the target text information, a location of text information that is in the target text information and that matches the location selection instruction, and using, as a to-be-processed audio location, a location of an audio segment that has the mapping relationship with the to-be-processed text location is: using, as a to-be-deleted text location in response to the deletion selection instruction for the target text information, a location of text information that is in the target text information and that matches the deletion selection instruction, and using, as a to-be-deleted audio location, a location of an audio segment that has the mapping relationship with the to-be-deleted text location. In this case, the to-be-processed text location includes the to-be-deleted text location, and the to-be-processed audio location includes the to-be-deleted audio location.

A delete control and an insert control are also displayed on the display page that displays the target audio and the target text information. The delete control is used for implementing a deletion process, and the insert control is used for implementing an insertion process. As shown in (2) of FIG. 4, a delete control 405 and an insert control 406 are displayed in a region between the target audio and the target text information.

In a possible implementation, in the display page that displays the target audio and the target text information, the delete control is in a selected state by default, as shown in (2) of FIG. 4, the delete control 405 is in a selected state. Certainly, in an example embodiment, the delete control on the display page may also be in an unselected state by default, which is not limited in this embodiment of this application.

When the delete control is in the selected state, the interaction object can select text information that needs to be deleted from the target text information. The selected state of the delete control may refer to a default state, or may refer to a state after the interaction object actively triggers the delete control.

The text information that needs to be deleted may refer to text information in which an error exists in converted text due to nonstandard vocalization in the audio recording process, or may refer to text information that is not converted into text accurately due to a relatively low vocalization volume (in this case, the text information may refer to empty text information).

An operation of selecting the text information that needs to be deleted from the target text information by the interaction object is not limited in this embodiment of this application. For example, the interaction object selects, by clicking one piece of text or some pieces of text, text information that needs to be deleted, or the interaction object selects a continuous text block in a long-press manner, and uses text information corresponding to the selected text block as text information that needs to be deleted.

When it is detected that text information in the target text information is selected by the interaction object in the selected state of the delete control, the terminal obtains the deletion selection instruction of the target text information. In response to obtaining the deletion selection instruction of the target text information, the terminal determines, from the target text information, text information that matches the deletion selection instruction, and uses a location of the text information that matches the deletion selection instruction as a to-be-deleted text location. The deletion selection instruction is used for indicating the location of the text information that needs to be deleted and selected by the interaction object. The text information that matches the deletion selection instruction is text information that is selected by the interaction object and that needs to be deleted.

The to-be-deleted text location may be a location of text information formed by using at least one piece of text and at least one spacing, or may be a location of text information formed by an empty character. This is not limited in this embodiment of this application. After the to-be-deleted text location is determined, because there is the mapping relationship between the location of the audio segment in the target audio and the location of the text information in the target text information, a location of an audio segment that has the mapping relationship with the to-be-deleted text location can be determined, and the location of the audio segment that has the mapping relationship with the to-be-deleted text location can be used as the to-be-deleted audio location. Generally, the to-be-deleted audio location is corresponding to an audio segment, and text information obtained after conversion of the audio segment is text information corresponding to the to-be-deleted text location.

For example, as shown in (2) of FIG. 4, when the interaction object selects "Evil spirits are riding the wind" from the target text information, the terminal obtains a deletion selection instruction of the target text information. In this case, the to-be-deleted text location determined by the terminal is a location of the text information "Evil spirits are riding the wind". A to-be-deleted audio location that has a mapping relationship with the location of the text information "Evil spirits are riding the wind" is determined according to the mapping relationship between the location of the audio segment in the target audio and the location of the text information in the target text information. The to-be-deleted audio location is a location of the to-be-deleted audio segment.

In a possible implementation, text information corresponding to a reference location in the target text information is selected by default on the display page before the interaction object selects the text information that needs to be deleted. In this case, the interaction object may use the text information selected by default as the text information that needs to be deleted, or may actively select another piece of text information as the text information that needs to be deleted. The reference location is set according to experience, for example, the reference location is a location corresponding to the last sentence.

In a possible implementation, after the to-be-deleted audio location is determined, a start pointer and an end pointer are used for locating the to-be-deleted audio location. As shown in (2) of FIG. 4, a location between a start pointer 407 and an end pointer 408 is a to-be-deleted audio location. Locations of the start pointer 407 and end pointer 408 move as ripples are dragged to maintain that the location between the start pointer 407 and end pointer 408 is always a to-be-deleted audio location having a mapping relationship with to-be-deleted text location.

In a possible implementation, the text information corresponding to the to-be-deleted text location in the target text information is used as first text information, and the audio segment corresponding to the to-be-deleted audio location in the target audio is used as a first audio segment. In a possible implementation, after the first text information and the first audio segment are determined, the first text information in the target text information is highlighted and the first audio segment in the target audio is highlighted.

The first text information and the first audio segment are highlighted, so that the interaction object can visually view the text information and the audio segment that are corresponding to the to-be-deleted location and selected by the interaction object, so as to visually determine whether to replace the selected to-be-deleted location. Highlighting the first text information can distinguish the first text information from other text information. A manner of highlighting the first text information is not limited in this embodiment of this application, provided that the first text information can be distinguished from other text information. For example, the manner of highlighting the first text information includes at least one of the following: thickening and displaying the first text information, displaying the first text information in italics, and displaying the first text information in a color different from that of other text information.

Highlighting the first audio segment can distinguish the first audio segment from another audio segment. A manner of highlighting the first audio segment is not limited in this embodiment of this application, provided that the first audio segment can be distinguished from another audio segment. For example, the manner of highlighting the first audio segment includes at least one of the following: thickening and displaying a ripple of the first audio segment, and displaying the ripple of the first audio segment in a color different from that of a ripple of another audio segment. For example, the highlighted first text information and first audio segment are highlighted as shown in (2) of FIG. 4.

In an example embodiment, in a state in which a delete control is selected, the interaction object can further select text information formed by an empty character in the target text information, where the text information formed by the empty character refers to text information corresponding to an audio segment, in the target audio, in which no sound exists or extremely weak sound exists. In this case, the to-be-deleted text location is a location of the empty character, and the to-be-deleted audio location is a location of an audio segment in which no ripple exists or a ripple height is extremely small. For example, a display page in this case is shown in (3) of FIG. 4.

Case 2: The location selection instruction includes an insertion selection instruction.

When the location selection instruction includes the insertion selection instruction, an implementation process of using, as a to-be-processed text location in response to obtaining the location selection instruction for the target text information, a location of text information that is in the target text information and that matches the location selection instruction, and using, as a to-be-processed audio location, a location of an audio segment that has the mapping relationship with the to-be-processed text location is: using, as a to-be-inserted text location in response to obtaining the insertion selection instruction for the target text information, a location of text information that is in the target text information and that matches the insertion selection instruction, and using, as a to-be-inserted audio location, a location of an audio segment that has the mapping relationship with the to-be-inserted text location. In this case, the to-be-processed text location includes the to-be-inserted text location, and the to-be-processed audio location includes the to-be-inserted audio location.

In a possible implementation, the target text information includes a spacing formed by text. The spacing formed by text includes a spacing before the first text, a spacing between any two pieces of text, and a spacing after the last text. A process of obtaining the insertion selection instruction of the target text information includes: displaying an insert control on the display page that displays the target audio and the target text information; displaying, based on a trigger operation performed by the interaction object on any spacing of the target text information, a cursor with a default attribute at a location of the any spacing; and obtaining the insertion selection instruction of the target text information in response to detecting a locating operation performed by the interaction object on the cursor with the default attribute and a trigger operation performed on the insert control.

The insert control is used for implementing an audio insertion process, and when a trigger operation performed by the interaction object on any spacing of the target text information is detected, a cursor with a default attribute is displayed at a location of the any spacing. The default attribute of the cursor is not limited in this embodiment of this application. For example, the cursor with the default attribute is a white cursor.

After the cursor is displayed, the interaction object can move the cursor with the default attribute to locate the cursor with the default attribute to a location of a spacing at which text information corresponding to a new audio segment that needs to be inserted. When the interaction object moves the cursor to the location of the spacing at which the text information corresponding to the new audio segment that needs to be inserted, the terminal detects a locating operation performed by the interaction object on the cursor with the default attribute. After the cursor is moved to the location of the spacing at which the text information corresponding to the new audio segment that needs to be inserted, the interaction object triggers the insert control, so as to indicate that an audio insertion operation needs to be performed. In this case, the terminal detects a trigger operation performed by the interaction object on the insert control. The terminal obtains the insertion selection instruction of the target text information in response to detecting the locating operation performed by the interaction object on the cursor with the default attribute and the trigger operation performed on the insert control.

This embodiment of this application sets no limitation on an operation in which the interaction object moves the cursor to the location of the spacing at which the text information corresponding to the new audio segment that needs to be inserted. For example, by directly dragging the cursor, the interaction object moves the cursor to the location of the spacing at which the text information corresponding to the new audio segment that needs to be inserted. Alternatively, the interaction object drags the cursor by dragging the ripple of the target audio, so as to move the cursor to the location of the spacing at which the text information corresponding to the new audio segment that needs to be inserted.

In response to obtaining the insertion selection instruction of the target text information, the terminal determines, in the target text information, text information that matches the insertion selection instruction, and uses a location of the text information that matches the insertion selection instruction as the to-be-inserted text location. The insertion selection instruction is used for indicating the location of the spacing at which the text information corresponding to the new audio segment that needs to be inserted and selected by the interaction object. The text information that matches the insertion selection instruction is the spacing at which the text information corresponding to the new audio segment that needs to be inserted and selected by the interaction object.

After the to-be-inserted text location is determined, because there is the mapping relationship between the location of the audio segment in the target audio and the location of the text information in the target text information, a location of an audio segment that has the mapping relationship with the to-be-inserted text location can be determined, and the location of the audio segment that has the mapping relationship with the to-be-inserted text location can be used as the to-be-inserted audio location.

In a possible implementation, after the to-be-inserted text location and the to-be-inserted audio location are determined, the cursor with the target attribute is displayed at the to-be-inserted text location, and the to-be-inserted audio location is moved to the locating pointer. In this manner, the to-be-inserted location (the to-be-inserted text location and the to-be-inserted audio location) can be visualized, so that the interaction object quickly determines whether the selected to-be-inserted location needs to be adjusted. The target attribute is different from the default attribute, and the cursor with the target attribute can be distinguished from the cursor with the default attribute, so as to improve a visual effect. For example, when the cursor with the default attribute is a white cursor, the cursor with the target attribute is a yellow cursor.

For example, a display page in which the location selection instruction includes the insertion selection instruction is shown in FIG. 6. In (1) of FIG. 6, a delete control 601 and an insert control 602 are displayed, and the insert control 602 is in a triggered state. If the to-be-inserted text location selected by the interaction object is a location of a spacing before text "evil", a cursor 603 with the target attribute is displayed at the to-be-inserted text location. The to-be-inserted audio location that has a mapping relationship with the to-be-inserted text location is moved to a locating pointer 604.

In an example embodiment, when the to-be-inserted text location is a location of a spacing after the last text in the target text information, as shown in (2) of FIG. 6, the cursor 603 with the target attribute is displayed at the location of the spacing after the last text. A location that is in the target audio and that has a mapping relationship with the location of the spacing after the last text in the target text information is a tail location of the target audio. As shown in (2) of FIG. 6, the tail location of the target audio is moved to the locating pointer 604.

Step 203: Process the target audio according to the to-be-processed audio location, and process the target text information according to the to-be-processed text location, so as to update the displayed target audio and target text information.

Regardless of case 1 or case 2 in step 202, the to-be-processed text location and the to-be-processed audio location may be determined. Then, the terminal can obtain the processing instruction according to the processing operation of the interaction object, process, based on the processing instruction, the target audio according to the to-be-processed audio location, and process the target text information according to the to-be-processed text location, so as to update the displayed target audio and target text information.

In a possible implementation, corresponding to the two cases of the location selection instruction, the processing instruction also has two cases. Next, processing processes in the two cases are separately described.

Case 1: The processing instruction includes a deletion confirmation instruction of the to-be-deleted text location.

Case 1 occurs when the location selection instruction is a deletion selection instruction. In case 1, the to-be-processed text location includes the to-be-deleted text location, and the to-be-processed audio location includes the to-be-deleted audio location.

FIG. 2B is a flowchart of an example implementation process of step 203 according to an embodiment of this application. FIG. 2B shows an implementation process of processing, in response to the processing instruction, the target audio according to the to-be-processed audio location and processing the target text information according to the to-be-processed text location in step 203, so as to update the displayed target audio and target text information, which specifically including the following two steps:

Step S2031: Delete, in response to the deletion confirmation instruction of the to-be-deleted text location, first text information in the target text information, and delete a first audio segment in the target audio.

The first text information is text information that is in the target text information and that is corresponding to the to-be-deleted text location, and the first audio segment is an audio segment that is in the target audio and that is corresponding to the to-be-deleted audio location.

Before step 1 is performed, the deletion confirmation instruction of the to-be-deleted text location needs to be first obtained. In a possible implementation, a manner of obtaining the deletion confirmation instruction of the to-be-deleted text location includes but is not limited to the following two manners:

1. A delete control in a selected state can be triggered, and in response to the interaction object triggering the delete control in the selected state, the terminal acquires the deletion confirmation instruction of the to-be-deleted text location.
2. The delete button is displayed next to the to-be-deleted text location, and in response to that the delete button is triggered, the terminal acquires the delete confirmation instruction of the to-be-deleted text location.

The deletion confirmation instruction of the to-be-deleted text location is used for instructing to delete text information at the to-be-deleted text location. After the deletion confirmation instruction of the to-be-deleted text location is acquired, the first text information in the target text information is deleted based on the deletion confirmation instruction of the to-be-deleted text location. The first audio segment in the target audio is an audio segment corresponding to the first text information. Therefore, after the first text information in the target text information is deleted, the first audio segment in the target audio needs to be deleted. That is, the first text information highlighted in (2) of FIG. 4 and the first audio segment are separately deleted from the target text information and the target audio.

In a possible implementation, after the first text information and the first audio segment are deleted from the target text information and the target audio, text information that is located after the first text information is automatically filled with the location of the first text information (that is, the to-be-deleted text location), and an audio segment that is located after the first audio segment is automatically filled with the location of the first audio segment (that is, the to-be-deleted audio location). In an example embodiment, the terminal automatically highlights text information of a next sentence of the first text information, and automatically highlights an audio segment corresponding to the text information of the next sentence of the first text information. If the text information of the next sentence of the first text information does not exist, text information of a previous sentence of the first text information is automatically highlighted, and an audio segment corresponding to the text information of the previous sentence of the first text information is automatically highlighted.

Step S2032: Use text information obtained after the first text information is deleted as updated target text information, and display the updated target text information;

and use audio obtained after the first audio segment is deleted as updated target audio, and display the updated target audio.

After the first text information in the target text information is deleted, the updated text information is determined based on the text information obtained after the first text information is deleted. In a possible implementation, the text information obtained after the first text information is deleted includes second text information and third text information, the second text information is text information that is in the target text information and that is before the first text information, and the third text information is text information that is in the target text information and that is after the first text information.

In this case, a process in which the text information obtained after the first text information is deleted is used as the updated text information is: performing concatenation processing on the second text information and the third text information, and using text information obtained after the concatenation processing as the updated target text information. The concatenation processing is to concatenate the last text in the second text information and the first text in the third text information, so that the second text information and the third text information are coherent.

In some embodiments, when the first text information is start text information or end text information in the target text information, only one piece of complete text information remains after the first text information is deleted, no additional concatenation processing is required, and the remaining text information is used as the updated text information.

After the updated text information is obtained, the updated target text information is displayed. In this case, the updated target text information is displayed on the display page.

After the first audio segment in the target audio is deleted, the updated target audio is determined based on the audio obtained after the first audio segment is deleted. In a possible implementation, the audio obtained after the first audio segment is deleted includes a second audio segment and a third audio segment, the second audio segment is an audio segment that is in the target audio and that is before the first audio segment, and the third audio segment is an audio segment that is in the target audio and that is after the first audio segment. In this case, a process of using the audio obtained after the first audio segment is deleted as the updated audio is: performing synthesis processing on the second audio segment and the third audio segment, and using audio obtained after the synthesis processing as the updated target audio.

In a synthesis process, a timestamp of the audio is synchronously updated, that is, the updated audio has an updated timestamp. A process of performing synthesis processing on the second audio segment and the third audio segment may be performed by the terminal, or may be performed by the server. This is not limited in this embodiment of this application. In this embodiment of this application, that the process of performing synthesis processing on the second audio segment and the third audio segment is performed by the terminal is used as an example for description. A manner of performing synthesis processing on the second audio segment and the third audio segment is not limited in this embodiment of this application, and any manner in which audio synthesis can be implemented may be used.

In some embodiments, the first audio segment is a start audio segment or an end audio segment in the target audio segment, after the first audio segment is deleted, only one complete audio segment remains, and no additional synthesis processing is required. However, a timestamp of the remaining audio segment needs to be updated to obtain the updated audio.

After the updated target audio is determined, the updated target audio is displayed. In this case, a ripple of the updated target audio is displayed on the display page.

Figure 7:
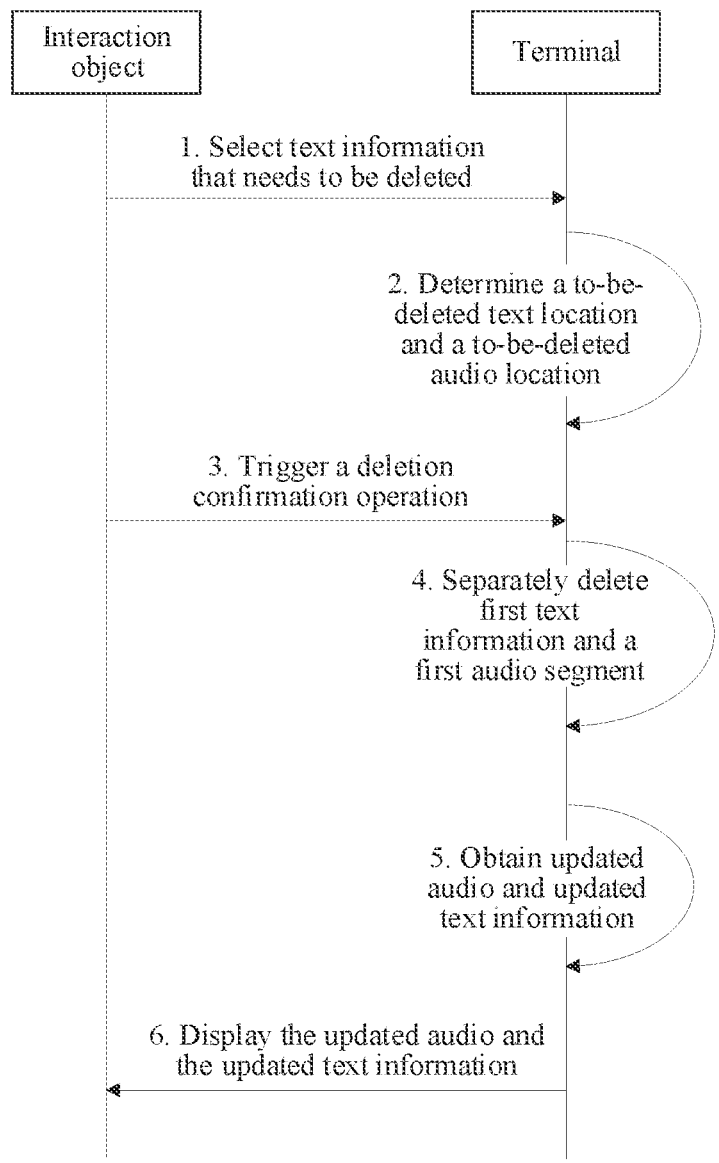
FIG. 7 is an interaction flowchart of an interaction object and a terminal in a process of deleting an audio segment from target audio according to an embodiment of this application.

After step 1 and step 2, an audio segment in the target audio can be deleted. For example, an interaction flowchart of an interaction object and a terminal in a process of deleting an audio segment from target audio is shown in FIG. 7. 1. The interaction object selects text information that needs to be deleted. 2. The terminal acquires a deletion selection instruction of the target text information, uses a location of text information that is in the target text information and that matches the deletion selection instruction as a to-be-deleted text location, obtains a to-be-deleted audio location by means of mapping according to the to-be-deleted text location and a mapping relationship between locations, and highlights (displays) text information corresponding to the to-be-deleted text location and an audio segment corresponding to the to-be-deleted audio location. 3. The interaction object triggers a deletion confirmation operation. 4. The terminal acquires a deletion confirmation instruction of the to-be-deleted text location, deletes, in response to the deletion confirmation instruction of the to-be-deleted text location, first text information in the target text information, and deletes a first audio segment in the target audio. 5. The terminal performs synthesis processing on audio after the deletion processing to obtain an updated audio; and performs concatenation processing on text information after the deletion processing to obtain updated target text information. 6. The terminal displays (shows) the updated audio and the updated text information. According to the foregoing steps, a process of deleting an audio segment from the target audio is completed.

For example, in the display pages shown in (2) and (3) of FIG. 4, a complete control 409 is further displayed. When a trigger operation of the complete control 409 is detected, a processing procedure for the target audio is exited.

Case 2: The processing instruction includes an audio insertion instruction of a to-be-inserted audio location.

Figure 2C:
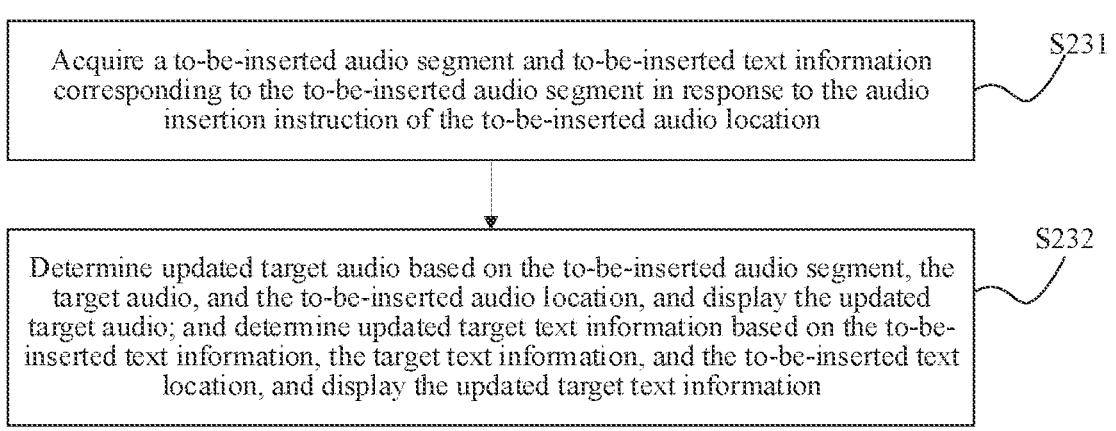
FIG. 2C is a flowchart of an example implementation process of step 203 according to an embodiment of this application.

Case 2 occurs when the location selection instruction is an insertion selection instruction. In case 2, the to-be-processed text location includes the to-be-inserted text location, and the to-be-processed audio location includes the to-be-inserted audio location. FIG. 2C is a flowchart of an example implementation process of step 203 according to an embodiment of this application. FIG. 2C shows an implementation process of processing, according to the processing instruction, the target audio according to the to-be-processed audio location and processing the target text information according to the to-be-processed text location in step 203, so as to update the displayed target audio and target text information, which specifically including the following two steps:

Step S231: Acquire a to-be-inserted audio segment and to-be-inserted text information corresponding to the to-be-inserted audio segment in response to the audio insertion instruction of the to-be-inserted audio location.

The audio insertion instruction of the to-be-inserted audio location is used for instructing to insert a new audio segment at the to-be-inserted audio location. Before step A is performed, the audio insertion instruction of the to-be-inserted audio location needs to be first obtained. In a possible implementation, a process of obtaining the audio insertion instruction of the to-be-inserted audio location includes step a and step b.

Step a: Display an audio recording control in response to obtaining the insertion selection instruction of the target text information.

When the insertion selection instruction of the target text information is obtained, it indicates that a new audio segment needs to be inserted. In this case, the terminal displays the audio recording control. The audio recording control is used for controlling a recording process of the new audio segment. For example, the audio recording control is shown as 605 in (1) of FIG. 6.

Step b: Obtain an audio insertion instruction of the to-be-inserted audio location based on a trigger operation performed by the interaction object on the audio recording control.

After the insertion selection instruction of the target text information is obtained, the to-be-inserted audio location and the to-be-inserted text location are determined. When the interaction object triggers the audio recording control, it indicates that a new audio segment needs to be inserted into the to-be-inserted audio location, and text information corresponding to the new audio segment needs to be inserted into the to-be-inserted text location.

The audio recording control is used for controlling the recording process of the new audio segment. When it is detected that the interaction object triggers the audio recording control, the terminal obtains the audio insertion instruction of to-be-inserted audio location based on the trigger operation performed by the interaction object on the audio recording control.

After the audio insertion instruction of the to-be-inserted audio location is acquired, the terminal acquires, based on the audio insertion instruction of the to-be-inserted audio location, a to-be-inserted audio segment and to-be-inserted text information corresponding to the to-be-inserted audio segment.

The audio insertion instruction of the to-be-inserted audio location is acquired according to the trigger operation performed by the interaction object on the audio recording control on the current display page. After the interaction object performs a trigger operation on the audio recording control on the current display page, the audio recording control changes to a representation form in a recording process (shown as an audio recording control 605 in (3) of FIG. 6). In this case, the interaction object inputs a sound that needs to be recorded, and the terminal performs audio recording. After the recording ends, the terminal acquires the to-be-inserted audio segment. A manner of obtaining the to-be-inserted text information corresponding to the to-be-inserted audio segment includes: 1. The terminal directly performs text conversion processing on the to-be-inserted audio segment to obtain the to-be-inserted text information. 2. The terminal sends the to-be-inserted audio segment to the server, and the server performs text conversion processing on the to-be-inserted audio segment, and then the server sends the to-be-inserted text information to the terminal, so that the terminal acquires the to-be-inserted text information corresponding to the to-be-inserted audio segment.

In a possible implementation, after the to-be-inserted text information corresponding to the to-be-inserted audio segment is acquired, a mapping relationship between a location of an audio segment in the to-be-inserted audio segment and a location of text information in the to-be-inserted text information may be further acquired.

Step S232: Determine updated target audio based on the to-be-inserted audio segment, the target audio, and the to-be-inserted audio location, and display the updated target audio; and determine updated target text information based on the to-be-inserted text information, the target text information, and the to-be-inserted text location, and display the updated target text information.

Figure 2D:
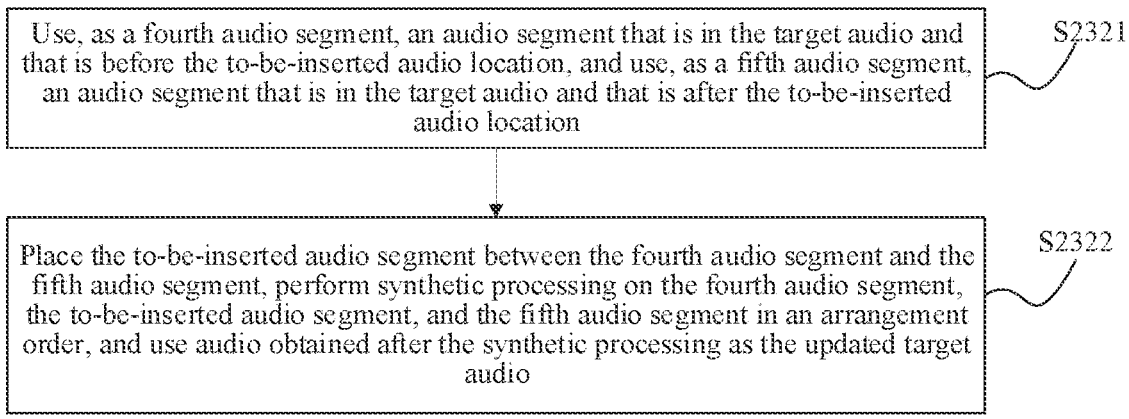
FIG. 2D is a flowchart of an example implementation process of step S232 according to an embodiment of this application.

In a possible implementation, FIG. 2D is a flowchart of an example implementation process of step S232 according to an embodiment of this application. As shown in FIG. 2D, an implementation process of determining the updated audio based on the to-be-inserted audio segment, the target audio, and the to-be-inserted audio location in step S232 is shown, which includes the following steps:

Step S2321: Use, as a fourth audio segment, an audio segment that is in the target audio and that is before the to-be-inserted audio location, and use, as a fifth audio segment, an audio segment that is in the target audio and that is after the to-be-inserted audio location.

Step S2322: Place the to-be-inserted audio segment between the fourth audio segment and the fifth audio segment, perform synthesis processing on the fourth audio segment, the to-be-inserted audio segment, and the fifth audio segment in an arrangement order, and use audio obtained after the synthesis processing as the updated target audio.

When the to-be-inserted audio location is at a start location of the target audio, the to-be-inserted audio segment is placed at the start location of the target audio, and the to-be-inserted audio segment and the target audio are synthesized in an arrangement order, and synthesized audio is used as the updated audio. When the to-be-inserted audio location is at an end location of the target audio, the to-be-inserted audio segment is placed at the end location of the target audio, synthesis processing is performed on the target audio and the to-be-inserted audio segment in an arrangement order, and synthesized audio is used as the updated audio. In a synthesis process, a timestamp of the audio is updated.

After the updated audio is determined, the updated audio is displayed (shown).

Figure 2E:
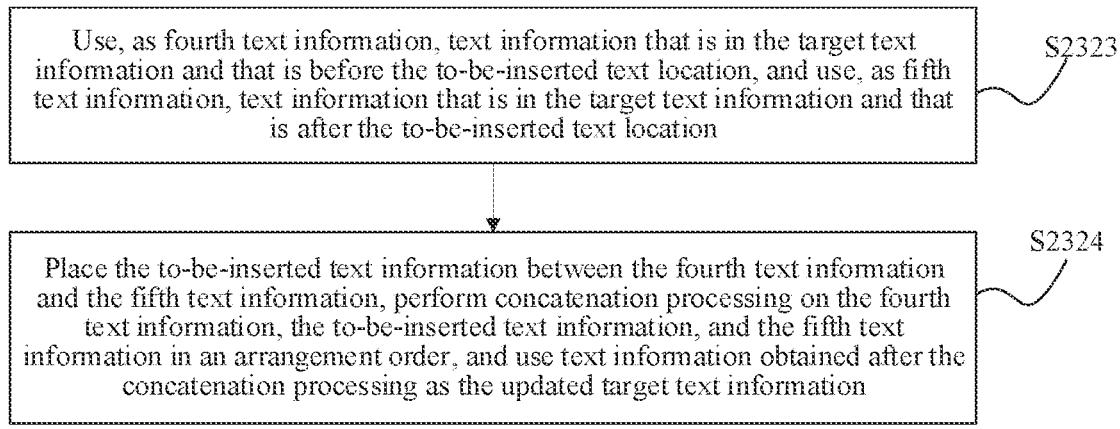
FIG. 2E is a flowchart of an example implementation process of step S232 according to an embodiment of this application.

In a possible implementation, FIG. 2E is a flowchart of an example implementation process of step S232 according to an embodiment of this application. As shown in FIG. 2E, an implementation process of determining the updated target text information based on the to-be-inserted text information, the target text information, and the to-be-inserted text location in step S232 is shown, which specifically includes:

Step S2323: Use, as fourth text information, text information that is in the target text information and that is before the to-be-inserted text location, and use, as fifth text information, text information that is in the target text information and that is after the to-be-inserted text location.

Step S2324: Place the to-be-inserted text information between the fourth text information and the fifth text information, perform concatenation processing on the fourth text information, the to-be-inserted text information, and the fifth text information in an arrangement order, and use text information obtained after the concatenation processing as the updated target text information.

When the to-be-inserted text location is located at a start location of the target text information, the to-be-inserted text information is placed at the start location of the target text information, the to-be-inserted text information and the target text information are concatenated in an arrangement order, and concatenated text information is used as the updated target text information. When the to-be-inserted text location is located at an end location of the target text information, the to-be-inserted text information is placed at the end location of the target text information, the target text information and the to-be-inserted text information are concatenated in an arrangement order, and concatenated text information is used as the updated text information.

After the updated text information is determined, the updated text information is displayed.

In a possible implementation, after the updated text information and the updated audio are determined, the mapping relationship between locations is updated according to the latest timestamp information, so as to obtain a mapping relationship between a location of text information in the updated text information and a location of an audio segment in the updated audio, thereby facilitating further processing of the updated audio.

In a possible implementation, in a process of acquiring the to-be-inserted audio segment, audio and text information displayed on the display page may be updated at a spacing of reference time according to an acquired to-be-inserted audio sub-segment. By reducing the spacing of the reference time, an effect of updating displayed audio and text information in real time in a process of acquiring a to-be-inserted audio segment can be achieved. In a possible implementation, in a process of updating displaying in real time, a newly inserted audio sub-segment and newly inserted text information are highlighted, so as to improve a visual effect. As shown in (3) of FIG. 6, newly inserted text information "I give you strength" is highlighted. A manner of highlighting the newly inserted text information may be displaying the newly inserted text information in a color different from that of another text information. For example, when a display color of another text information is w % bite, the newly inserted text information is highlighted in green. As shown in (3) of FIG. 6, a ripple of a newly inserted audio sub-segment on the left side of the locating pointer is highlighted. A manner of highlighting the ripple of the newly inserted audio sub-segment may be displaying the newly inserted audio sub-segment by using a different thickness from the ripple. For example, the ripple of the newly inserted audio sub-segment is highlighted in a bold ripple manner.

In addition to updating displaying in real time, the entire to-be-inserted audio segment and the entire to-be-inserted text information may be acquired, and then updated displaying is performed. This is not limited in this embodiment of this application.

In a possible implementation, in a process of recording to-be-inserted audio, the insert control and the delete control are adjusted to a non-triggerable state, such as the delete control 601 and the insert control 602 shown in (3) of FIG. 6, to avoid interference to a recording process of a new audio segment.

In a possible implementation, after the displaying the updated audio and displaying the updated text information, the method further includes: playing the updated audio based on a trigger instruction of a playback control. The playback control is shown as 606 in FIG. 6, a representation form of the playback control 606 before being triggered is shown in (1) to (3) of FIG. 6, and a representation form of the playback control 606 after being triggered is shown in (4) of FIG. 6. When the interaction object triggers the playback control, the playback control is converted into the representation shown in (4) of FIG. 6, and at the same time, the terminal plays the updated audio.

In a possible implementation, in a process in which the terminal plays the updated audio, scrolling display is performed on the updated text information, so that the text information corresponding to the currently played audio is displayed in a middle region of a display region of the text information, so that the interaction object can view the text information. In an example embodiment, in a process in which the terminal plays the updated audio, a display manner of the updated text information may not be changed, which is not limited in this embodiment of this application.

According to step A and step B, a processing process of inserting a new audio segment into the target audio is completed.

Figure 8:
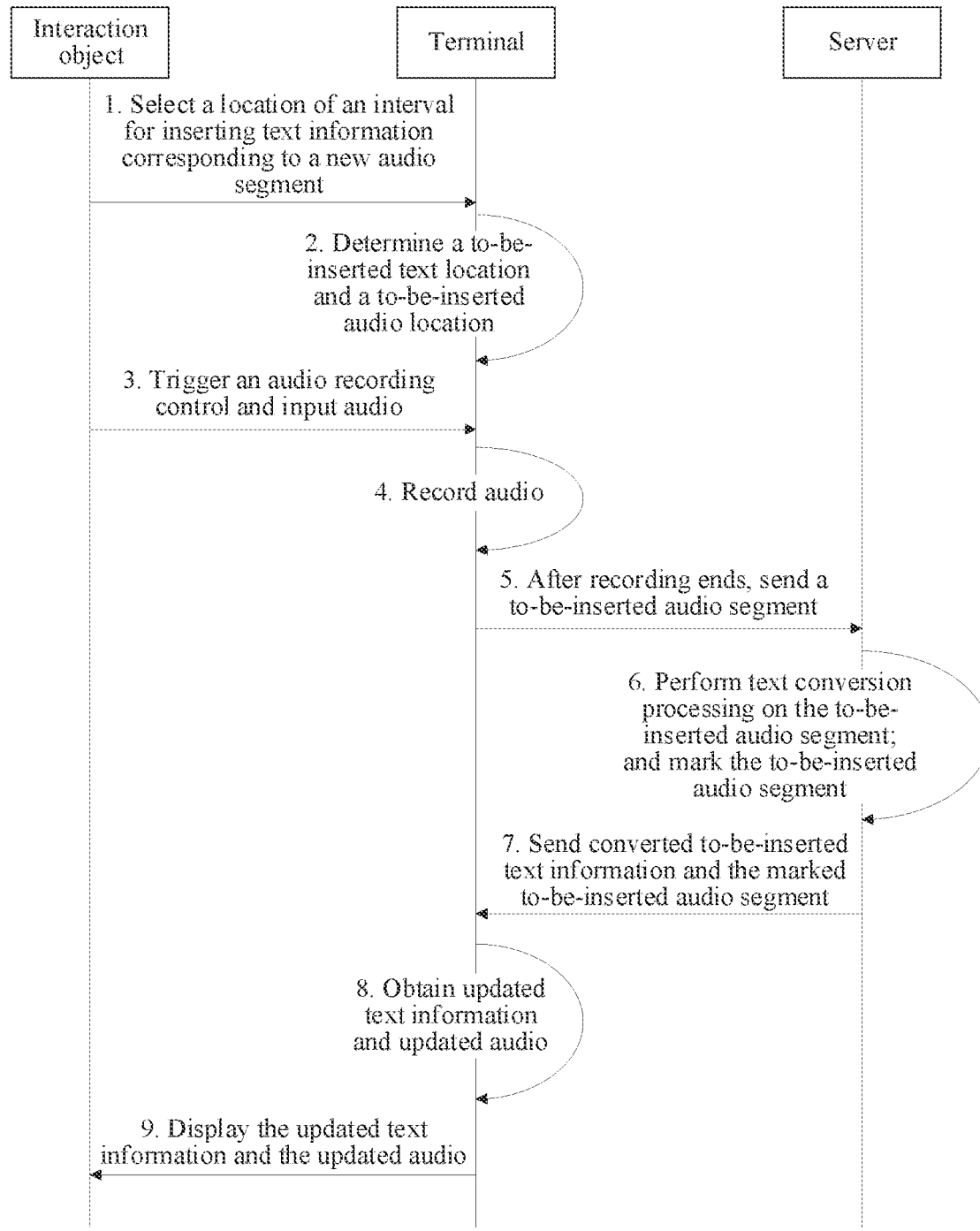
FIG. 8 is an interaction flowchart of an interaction object, a terminal, and a server in a process of inserting an audio segment into target audio according to an embodiment of this application.

For example, in the processing process of inserting an audio segment into the target audio, an interaction flowchart of an interaction object, a terminal, and a server is shown in FIG. 8. 1. The interaction object selects, from the target text information, a location of a spacing at which the text information corresponding to the new audio segment needs to be inserted. 2. The terminal acquires an insertion selection instruction of the target text information, uses, based on the insertion selection instruction of the target text, a location of text information that is in the target text information and that matches the insertion selection instruction as a to-be-inserted text location, and displays, at the to-be-inserted text location, a cursor with a target attribute; and determines a to-be-inserted audio location according to a mapping relationship, and moves the to-be-inserted audio location to a locating pointer. 3. The interaction object triggers the audio recording control and inputs audio. 4. The terminal records the audio input from the interaction object. 5. After the recording ends, the terminal acquires a to-be-inserted audio segment, and sends the to-be-inserted audio segment to the server. 6. After receiving the to-be-inserted audio segment, the server performs text conversion processing on the to-be-inserted audio segment, and marks a corresponding timestamp of the to-be-inserted audio segment according to converted to-be-inserted text information, so as to obtain a mapping relationship between a location of an audio segment in to-be-inserted audio segment and a location of text information in the to-be-inserted text information. 7. The server sends the converted to-be-inserted text information and the marked to-be-inserted audio segment to the terminal. 8. The terminal places the received to-be-inserted text information at the to-be-inserted text location in the target text information, and obtains updated text information by means of concatenation processing; and places the received to-be-inserted audio at the to-be-inserted audio location in the target audio, and obtains updated target audio by means of synthesis processing. 9. The terminal displays (shows) the updated audio and the updated text information. According to the foregoing steps, a process of inserting a new audio segment into the target audio is completed.

One time of processing or more times of consecutive processing can be performed on the target audio, and each time of processing is performed on the basis of updated audio and updated text information that are obtained after previous processing. Each processing process may refer to a process of deleting an audio segment or inserting a new audio segment.

Figure 9:
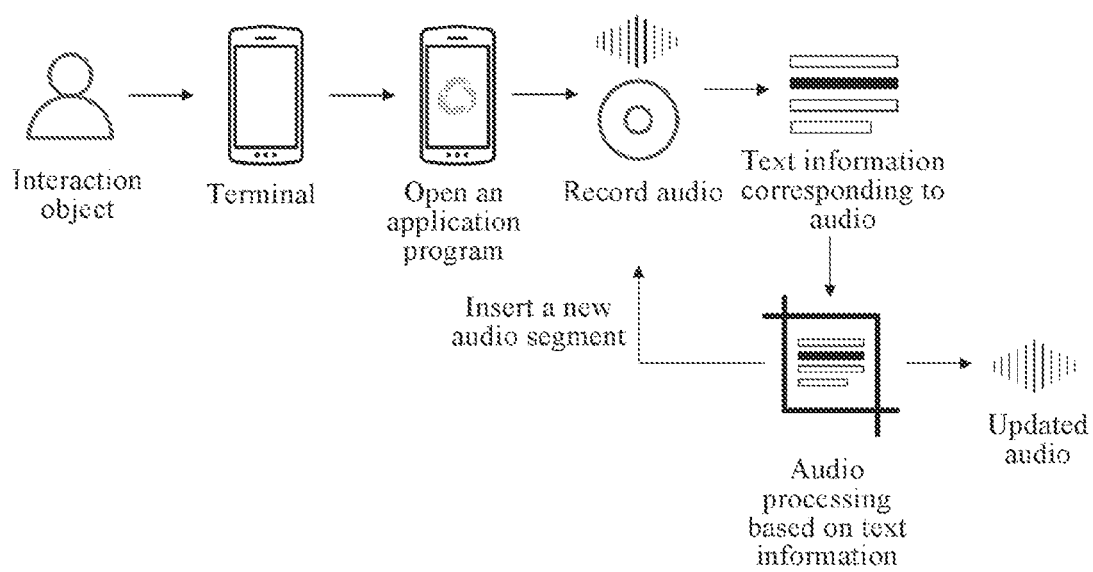
FIG. 9 is a schematic diagram of an audio processing process according to an embodiment of this application.

For example, an audio processing process is shown in FIG. 9. The interaction object opens, by using the terminal, an application program that supports audio recording and audio processing. A type of the application program is not limited in this embodiment of this application, provided that audio recording and audio processing can be supported. For example, the application program opened by the interaction object is an application program used for managing a subscribed account, and the application program can change a mobile terminal such as a mobile phone into an official account studio, and the interaction object uses the application program to publish content at any time and interact with readers. The application program has a simple editing tool that makes it easy for the interaction object to work as an author, so as to retain immediate inspiration and enjoy the fun of content creation.

As shown in FIG. 9, the interaction object records audio in the application program, and after the recording ends, performs text conversion processing on the audio to obtain text information corresponding to the audio. The audio and the text information corresponding to the audio are displayed on the display page, so as to implement audio processing based on the text information. In a process of implementing audio processing based on the text information, if the interaction object finds, on the display page, a recording result that is not expected, a corresponding audio segment may be deleted by deleting text information in the target text information. If the interaction object considers that a new audio segment needs to be inserted, the to-be-inserted audio location may be further inserted by determining a to-be-inserted text location according to the target text information, and then the new audio segment is inserted into the to-be-inserted audio location. After the audio processing is completed, updated audio is obtained, and the updated audio is relatively satisfactory audio of the interaction object.

In addition to the processing process of deleting an audio segment in the target audio and the processing process of inserting a new audio segment into the target audio in this embodiment of this application, this embodiment of this application may be further applied to another similar processing process. That is, this embodiment of this application is not limited to the two processing processes of deleting an audio segment in the target audio and inserting a new audio segment into the target audio. For example, this embodiment of this application may be further applied to a process in which an audio segment in the target audio is replaced with a new audio segment. For another similar processing process, refer to the two processing processes described in this embodiment of this application. Details are not described herein again.

In this embodiment of this application, audio is visualized, and visualization refers to presenting abstract information by using specific information. By visualizing audio as text information, mapping relationship processing is performed on a location of text information and a location of an audio segment, and corresponding audio is edited by using editing (for example, deleting) text, thereby improving audio processing efficiency and accuracy. Audio can be converted into text information synchronously by recording the audio directly in the application program. After the recording is completed, an audio segment can be quickly edited by editing (for example, deleting) the text information, thereby greatly reducing costs of audio editing. In addition, with reference to an audio-to-text conversion function, a to-be-inserted audio location at which a new audio segment needs to be inserted can be quickly determined according to a to-be-inserted text location, so as to quickly implement a process of inserting the new audio segment.

In this embodiment of this application, the to-be-processed text location is first determined according to the location of the text information in the target text information, and then the location of the audio segment that has the mapping relationship with the to-be-processed text location is used as the to-be-processed audio location, so as to implement the processing process of the target audio according to the processing instruction. In this audio processing process, an audio location that needs to be processed is further determined by determining the to-be-processed text location, where recognition of the text information is relatively high, efficiency and accuracy of determining the to-be-processed text location according to the location of the text information in the target text information are relatively high, thereby improving efficiency and accuracy of determining the to-be-processed audio location, and improving audio processing efficiency and an audio processing effect.

Figure 10:
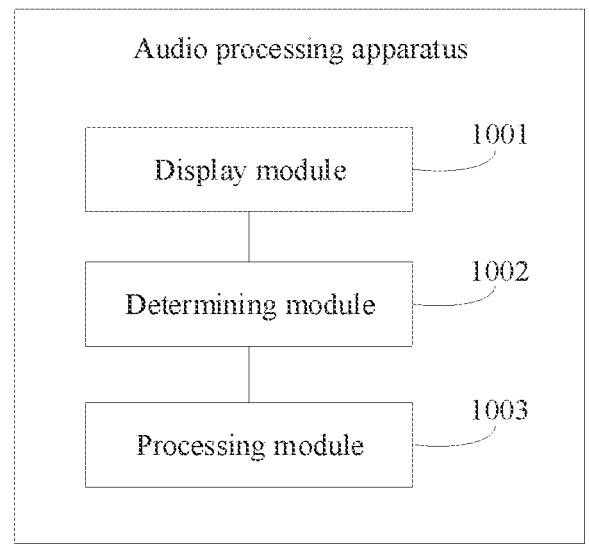
FIG. 10 is a schematic diagram of an audio processing apparatus according to an embodiment of this application.

Referring to FIG. 10, an embodiment of this application provides an audio processing apparatus, and the apparatus includes:

a display module 1001, configured to display target audio and target text information corresponding to the target audio based on a processing request of the target audio, a mapping relationship existing between a location of an audio segment in the target audio and a location of text information in the target text information;

a determining module 1002, configured to: use, as a to-be-processed text location in response to a location selection instruction for the target text information, a location of text information that is in the target text information and that matches a location selection instruction, and use, as a to-be-processed audio location, a location of an audio segment that has the mapping relationship with the to-be-processed text location; and a processing module 1003, configured to: process, in response to a processing instruction, the target audio according to the to-be-processed audio location, and process the target text information according to the to-be-processed text location, so as to update the displayed target audio and target text information.

In a possible implementation, the to-be-processed text location includes a to-be-deleted text location, the to-be-processed audio location includes a to-be-deleted audio location, and the processing instruction includes a deletion confirmation instruction of the to-be-deleted text location; the processing module 1003 is configured to: delete, in response to the deletion confirmation instruction of the to-be-deleted text location, first text information in the target text information, and delete a first audio segment in the target audio, the first text information being text information that is in the target text information and that is corresponding to the to-be-deleted text location, and the first audio segment being an audio segment that is in the target audio and that is corresponding to the to-be-deleted audio location; use text information obtained after the first text information is deleted as updated target text information, and display the updated target text information; and use audio obtained after the first audio segment is deleted as updated audio, and display the updated audio.

In a possible implementation, the text information obtained after the first text information is deleted includes second text information and third text information, the second text information is text information that is in the target text information and that is before the first text information, and the third text information is text information that is in the target text information and that is after the first text information; the processing module 1003 is further configured to perform concatenation processing on the second text information and the third text information, and use text information obtained after the concatenation processing as the updated text information;

the audio obtained after the first audio segment is deleted includes a second audio segment and a third audio segment, the second audio segment is an audio segment that is in the target audio and that is before the first audio segment, and the third audio segment is an audio segment that is in the target audio and that is after the first audio segment; and the processing module 1003 is further configured to perform synthesis processing on the second audio segment and the third audio segment, and use audio obtained after the synthesis processing as the updated target audio.

In a possible implementation, the display module 1001 is further configured to highlight the first text information in the target text information, and highlight the first audio segment in the target audio.

In a possible implementation, the to-be-processed text location includes a to-be-inserted text location, the to-be-processed audio location includes a to-be-inserted audio location, and the processing instruction includes an audio insertion instruction of the to-be-inserted audio location; the processing module 1003 is configured to: acquire a to-be-inserted audio segment and to-be-inserted text information corresponding to the to-be-inserted audio segment in response to the audio insertion instruction of the to-be-inserted audio location; determine updated target audio based on the to-be-inserted audio segment, the target audio, and the to-be-inserted audio location, and display the updated target audio; and determine updated text information based on the to-be-inserted text information, the target text information, and the to-be-inserted text location, and display the updated text information.

In a possible implementation, the processing module 1003 is further configured to use, as a fourth audio segment, an audio segment that is in the target audio and that is before the to-be-inserted audio location, and use, as a fifth audio segment, an audio segment that is in the target audio and that is after the to-be-inserted audio location; place the to-be-inserted audio segment between the fourth audio segment and the fifth audio segment, perform synthesis processing on the fourth audio segment, the to-be-inserted audio segment, and the fifth audio segment in an arrangement order, and use audio obtained after the synthesis processing as the updated target audio;

use, as fourth text information, text information that is in the target text information and that is before the to-be-inserted text location, and use, as fifth text information, text information that is in the target text information and that is after the to-be-inserted text location; and place the to-be-inserted text information between the fourth text information and the fifth text information, perform concatenation processing on the fourth text information, the to-be-inserted text information, and the fifth text information in an arrangement order, and use text information obtained after the concatenation processing as the updated text information.

In a possible implementation, the display module 1001 is further configured to: after determining the to-be-inserted text location and the to-be-inserted audio location, display a cursor with a target attribute at the to-be-inserted text location.

Figure 11:
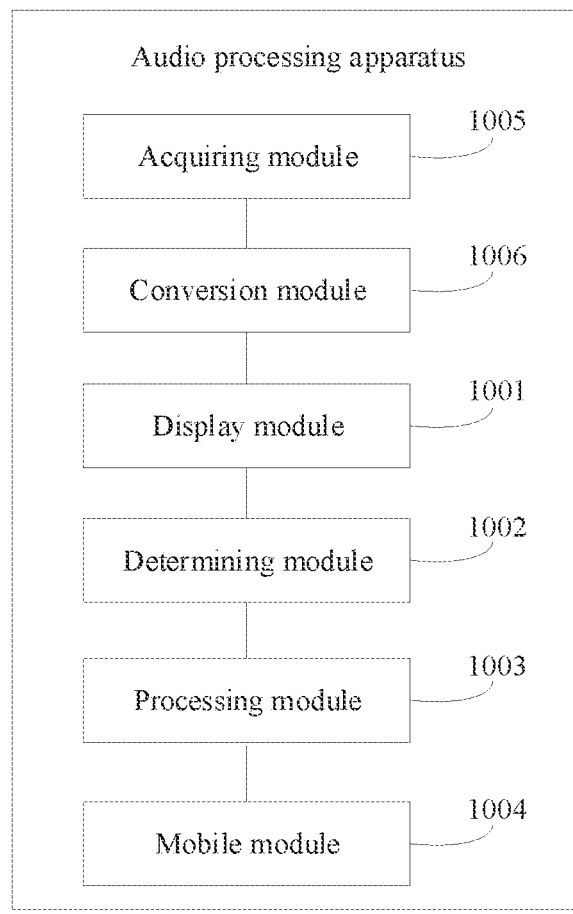
FIG. 11 is a schematic diagram of an audio processing apparatus according to an embodiment of this application.

Referring to FIG. 11, the apparatus further includes:
a moving module 1004, configured to move the to-be-inserted audio location to a locating pointer.

In a possible implementation, the location selection instruction includes an insertion selection instruction; the display module 1001 is further configured to display an audio recording control in response to obtaining the insertion selection instruction of the target text information; and
the determining module 1002 is further configured to obtain an audio insertion instruction of the to-be-inserted audio location based on a trigger operation performed by the interaction object on the audio recording control.

In a possible implementation, the target text information includes a spacing formed by text, and the display module 1001 is further configured to display an insert control on the display page that displays the target audio and the target text information; and display, based on a trigger operation performed by the interaction object on any spacing of the target text information, a cursor with a default attribute at a location of the any spacing; and
the determining module 1002 is further configured to: obtain the insertion selection instruction of the target text information in response to detecting a locating operation performed by the interaction object on the cursor with the default attribute and a trigger operation performed on the insert control.

In a possible implementation, referring to FIG. 11, the apparatus further includes:
an acquiring module 1005, configured to acquire the target audio based on a processing request for the target audio, and
a conversion module 1006, configured to perform text conversion processing on the target audio to obtain the target text information corresponding to the target audio; and
the determining module 1002 is further configured to determine, based on the target audio and the target text information, a mapping relationship between a location of an audio segment in the target audio and a location of text information in the target text information.

In this embodiment of this application, the to-be-processed text location is first determined according to the location of the text information in the target text information, and then the location of the audio segment that has the mapping relationship with the to-be-processed text location is used as the to-be-processed audio location, so as to implement the processing process of the target audio according to the processing instruction. In this audio processing process, an audio location that needs to be processed is further determined by determining the to-be-processed text location, where recognition of the text information is relatively high, efficiency and accuracy of determining the to-be-processed text location according to the location of the text information in the target text information are relatively high, thereby improving efficiency and accuracy of determining the to-be-processed audio location, and improving audio processing efficiency and an audio processing effect.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 12:
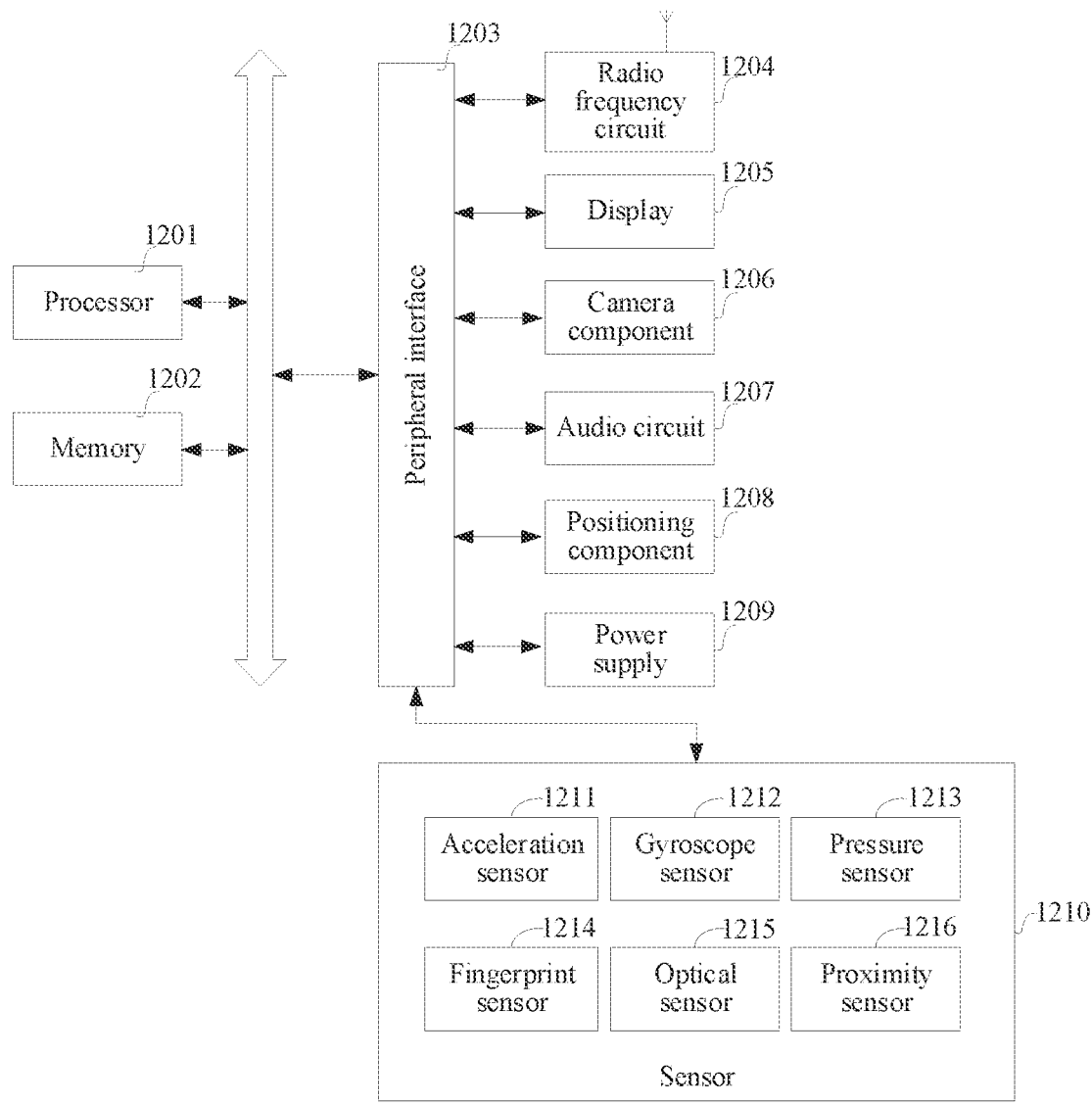
FIG. 12 is a schematic structural diagram of an audio processing device according to an embodiment of this application.

FIG. 12 is a schematic structural diagram of an audio processing device according to an embodiment of this application. The device may be a terminal such as: a smartphone, a tablet computer, a notebook computer, or a desktop computer. The terminal may also be referred to as user equipment, a portable terminal, a laptop terminal, or a desktop terminal, among other names.

Generally, the terminal includes a processor 1201 and a memory 1202.

The processor 1201 may include one or more processing cores. For example, the processor 1201 may be a 4-core processor or an 8-core processor. The processor 1201 may be implemented by using at least one hardware form of a digital signal processor (DSP), a field-programmable gate array (FPGA), and a programmable logic array (PLA). The processor 1201 may alternatively include a main processor and a coprocessor. The main processor is configured to process data in an active state, also referred to as a central processing unit (CPU). The coprocessor is a low-power processor configured to process data in a standby state. In some embodiments, the processor 1201 may be integrated with a graphics processing unit (GPU). The GPU is configured to render and draw content that needs to be displayed on a display. In some embodiments, the processor 1201 may further include an AI processor. The AI processor is configured to process computing operations related to ML.

The memory 1202 may include one or more computer-readable storage media that may be non-transitory. The memory 1202 may further include a high-speed random access memory, and a non-volatile memory such as one or more magnetic disk storage devices and a flash storage device. In some embodiments, a non-transitory computer-readable storage medium in the memory 1202 is configured to store at least one instruction, the at least one instruction being configured to be executed by the processor 1201 to implement the audio processing method provided in the method embodiments of this application.

In some embodiments, the terminal may include a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Specifically, the peripheral device includes: at least one of a radio frequency (RF) circuit 1204, a touch display screen 1205, a camera component 1206, an audio circuit 1207, a positioning component 1208, and a power supply 1209.

A person skilled in the art may understand that a structure shown in FIG. 12 constitutes no limitation on the terminal. The terminal may include more or fewer assemblies than those shown in the drawings, some assemblies may be combined, and a different assembly may be used to construct the device.

In an example embodiment, a computer device is further provided, the computer device includes a processor and a memory, and the memory stores at least one segment of program code. The at least one segment of program code is loaded and executed by one or more processors, so as to implement any one of the foregoing audio processing methods.

In an example embodiment, a computer readable storage medium is further provided, where the computer readable storage medium stores at least one segment of program code, and the at least one segment of program code is loaded and executed by a processor of a computer device, so as to implement any one of the foregoing audio processing methods.

In a possible implementation, the computer-readable storage medium may be a read-only memory (ROM), a random access memory (random-access memory, RAM), a compact disc read-only memory (CD-ROM), a magnetic tape, a floppy disk, an optical data storage device, and the like.

In an exemplary embodiment, a computer program product or a computer program is provided. The computer program product or the computer program includes computer instructions, and the computer instructions are stored in a computer-readable storage medium. A processor of a computer device reads the computer instruction from the computer readable storage medium, and the processor executes the computer instruction, so that the computer device performs any one of the foregoing audio processing methods.

It is to be understood that "plurality of" mentioned in this specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects.

The foregoing descriptions are merely examples of the embodiments of this application, but are not intended to limit this application. Any modification, equivalent replacement, or improvement made without departing from the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs an audio processing method. In practical application, the foregoing functions may be allocated to and completed by different functional modules according to requirements, that is, an inner structure of a device is divided into different functional modules to implement all or a part of the functions described above.

What is claimed is:

1. An audio processing method, performed by a computing device and comprising:
    displaying a graphical user interface of an application program, the graphical user interface including an audio recording control;
    in response to a first user selection of the audio recording control:
        starting recording a target audio clip; and
        converting the target audio clip into target text information synchronously;
    in response to a second user selection of the audio recording control:
        stopping recording the target audio clip; and
        displaying the target audio clip and the corresponding target text information having a mapping relationship between a location of an audio segment in the target audio clip and a location of text information in the corresponding target text information;
    receiving, a selection of a location in the corresponding target text information as a to-be-processed text location;
    marking the to-be-processed text location within the corresponding target text information;
    marking a to-be-processed audio location of an audio segment in the target audio clip that has the mapping relationship with the to-be-processed text location;
    processing the target audio clip at the to-be-processed audio location to generate an updated target audio clip, and updating the corresponding target text information at the to-be-processed text location to generate updated target text information, further comprising:
        receiving a processing instruction of an interaction object in the graphical user interface;
        in accordance with the processing instruction being a deletion confirmation instruction, deleting first text information in the corresponding target text information at the to-be-processed text location, updating the target audio clip by deleting a first audio segment in the target audio clip corresponding to the to-be-processed text location and displaying text information remaining after the first text information is deleted as the updated target text information; and
        in accordance with the processing instruction being an audio insertion instruction, acquiring a to-be-inserted audio segment and to-be-inserted text information corresponding to the to-be-inserted audio segment, generating the updated target audio clip based on the to-be-inserted audio segment, the target audio clip, and the to-be-inserted audio location, and generating the updated target text information based on the to-be-inserted text information, the corresponding target text information, and the to-be-inserted text location; and
    displaying the updated target audio clip and the updated target text information in the graphical user interface.

2. The method according to claim 1, wherein the updated target text information comprises second text information and third text information, the second text information is displayed before the, and the third text information is displayed after the first text information; using text information obtained after the first text information is deleted as updated target text information comprises:
- performing concatenation processing on the second text information and the third text information, and using text information obtained after the concatenation processing as the updated target text information;
- the audio obtained after the first audio segment is deleted comprises a second audio segment before the first audio segment, and a third audio segment that is after the first audio segment; and using audio obtained after the first audio segment is deleted as the updated audio clip comprises:
- performing synthesis processing on the second audio segment and the third audio segment, and using audio obtained after the synthesis processing as the updated target audio clip.

3. The method according to claim 1, further comprising:
- prior to deleting, in response to the deletion confirmation instruction, the first text information in the corresponding target text information at the to-be-processed text location, and deleting the first audio segment in the target audio clip:
- highlighting the first text information in the target text information, and highlighting the first audio segment in the target audio clip.

4. The method according to claim 1, wherein generating the updated target audio clip based on the to-be-inserted audio segment, the target audio clip, and the to-be-inserted audio location comprises:
- placing the to-be-inserted audio segment between a fourth audio segment of the target audio clip and a fifth audio segment of the target audio clip;
- performing synthesis processing on the fourth audio segment, the to-be-inserted audio segment, and the fifth audio segment in an arrangement order to generate the updated target audio clip;
- and wherein generating the updated target text information based on the to-be-inserted text information, the corresponding target text information, and the to-be-inserted text location comprises:
- placing the to-be-inserted text information between fourth text information associated with the fourth audio segment and a fifth text information associated with the fifth audio segment, performing concatenation processing on the fourth text information, the to-be-inserted text information, and the fifth text information in an arrangement order to obtain the updated target text information.

5. The method according to claim 1, further comprising:
- after determining the to-be-inserted text location and the to-be-inserted audio location, displaying a cursor with a target attribute at the to-be-inserted text location; and moving the to-be-inserted audio location to a locating pointer.

6. The method according to claim 1, wherein the using, as a to-be-processed text location, a location of text information that is in the target text information and that matches a location selection instruction, and using, as a to-be-processed audio location, a location of an audio segment that has the mapping relationship with the to-be-processed text location comprises: using, as a to-be-processed text location in response to a location selection instruction for the target text information, a location of text information that is in the target text information and that matches a location selection instruction, and using, as a to-be-processed audio location, a location of an audio segment that has the mapping relationship with the to-be-processed text location; the location selection instruction comprises an insertion selection instruction; and
- before the acquiring a to-be-inserted audio segment and to-be-inserted text information corresponding to the to-be-inserted audio segment in response to the audio insertion instruction of the to-be-inserted audio location, the method further comprises:
- displaying an audio recording control in response to obtaining the insertion selection instruction of the target text information; and
- obtaining an audio insertion instruction of the to-be-inserted audio location based on a trigger operation performed by the interaction object on the audio recording control.

7. The method according to claim 6, wherein the target text information comprises a spacing formed by text, and before the displaying an audio recording control in response to obtaining the insertion selection instruction of the target text information, the method further comprises:
- displaying an insert control on a display page displaying the target audio clip and the target text information;
- displaying, based on a trigger operation of an interaction object on a spacing of the target text information, a cursor with a default attribute at a location of the spacing; the default attribute being different from the target attribute; and
- obtaining an insertion selection instruction of the target text information in response to detecting a locating operation performed by the interaction object on the cursor with the default attribute and a trigger operation performed on the insert control.

8. The method according to claim 1, further comprising:
- prior to displaying target audio and target text information corresponding to the target audio:
- acquiring the target audio clip based on a processing request for the target audio clip;
- performing text conversion processing on the target audio clip to obtain the target text information corresponding to the target audio clip; and
- determining, based on the target audio clip and the target text information, a mapping relationship between a location of an audio segment in the target audio clip and a location of text information in the target text information.

9. An electronic device, comprising:
- one or more processors; and
- memory storing one or more programs, the one or more programs comprising instructions that, when executed by the one or more processors, cause the one or more processors to perform operations comprising:
- displaying a graphical user interface of an application program, the graphical user interface including an audio recording control;
- in response to a first user selection of the audio recording control:
  - starting recording a target audio clip; and
  - converting the target audio clip into target text information synchronously;
- in response to a second user selection of the audio recording control:
  - stopping recording the target audio clip; and
  - displaying the target audio clip and the corresponding target text information having a mapping relationship between a location of an audio segment in the target audio clip and a location of text information in the corresponding target text information;

receiving, a selection of a location in the corresponding target text information as a to-be-processed text location;

marking the to-be-processed text location within the corresponding target text information;

marking a to-be-processed audio location of an audio segment in the target audio clip that has the mapping relationship with the to-be-processed text location;

processing the target audio clip at the to-be-processed audio location to generate an updated target audio clip, and updating the corresponding target text information at the to-be-processed text location to generate updated target text information, further comprising:

receiving a processing instruction of an interaction object in the graphical user interface;

in accordance with the processing instruction being a deletion confirmation instruction, deleting first text information in the corresponding target text information at the to-be-processed text location, updating the target audio clip by deleting a first audio segment in the target audio clip corresponding to the to-be-processed text location and displaying text information remaining after the first text information is deleted as the updated target text information; and in accordance with the processing instruction being an audio insertion instruction, acquiring a to-be-inserted audio segment and to-be-inserted text information corresponding to the to-be-inserted audio segment, generating the updated target audio clip based on the to-be-inserted audio segment, the target audio clip, and the to-be-inserted audio location, and generating the updated target text information based on the to-be-inserted text information, the corresponding target text information, and the to-be-inserted text location; and displaying the updated target audio clip and the updated target text information in the graphical user interface.

10. The electronic device according to claim 9, wherein the updated target text information comprises second text information and third text information, the second text information is displayed before the first text information, and the third text information is displayed after the first text information; using text information obtained after the first text information is deleted as updated target text information comprises:

performing concatenation processing on the second text information and the third text information, and using text information obtained after the concatenation processing as the updated target text information;

the audio obtained after the first audio segment is deleted comprises a second audio segment before the first audio segment, and a third audio segment that is after the first audio segment; and using audio obtained after the first audio segment is deleted as the updated audio clip comprises:

performing synthesis processing on the second audio segment and the third audio segment, and using audio obtained after the synthesis processing as the updated target audio clip.

11. The electronic device according to claim 9, wherein the operations further comprise:

prior to deleting, in response to the deletion confirmation instruction, the first text information in the corresponding target text information at the to-be-processed text location, and deleting the first audio segment in the target audio clip:

highlighting the first text information in the target text information, and highlighting the first audio segment in the target audio clip.

12. The electronic device according to claim 9, wherein the operations further comprise:

prior to displaying target audio and target text information corresponding to the target audio:

acquiring the target audio clip based on a processing request for the target audio clip;

performing text conversion processing on the target audio clip to obtain the target text information corresponding to the target audio clip; and determining, based on the target audio clip and the target text information, a mapping relationship between a location of an audio segment in the target audio clip and a location of text information in the target text information.

13. A non-transitory computer-readable storage medium, storing a computer program, the computer program, when executed by one or more processors of an electronic device, cause the one or more processors to perform operations comprising:

displaying a graphical user interface of an application program, the graphical user interface including an audio recording control;

in response to a first user selection of the audio recording control:

starting recording a target audio clip; and converting the target audio clip into target text information synchronously;

in response to a second user selection of the audio recording control:

stopping recording the target audio clip; and displaying the target audio clip and the corresponding target text information having a mapping relationship between a location of an audio segment in the target audio clip and a location of text information in the corresponding target text information;

receiving, a selection of a location in the corresponding target text information as a to-be-processed text location;

marking the to-be-processed text location within the corresponding target text information;

marking a to-be-processed audio location of an audio segment in the target audio clip that has the mapping relationship with the to-be-processed text location;

processing the target audio clip at the to-be-processed audio location to generate an updated target audio clip, and updating the corresponding target text information at the to-be-processed text location to generate updated target text information, further comprising:

receiving a processing instruction of an interaction object in the graphical user interface;

in accordance with the processing instruction being a deletion confirmation instruction, deleting first text information in the corresponding target text information at the to-be-processed text location, updating the target audio clip by deleting a first audio segment in the target audio clip corresponding to the to-be-processed text location and displaying text information remaining after the first text information is deleted as the updated target text information; and in accordance with the processing instruction being an audio insertion instruction, acquiring a to-be-inserted audio segment and to-be-inserted text information corresponding to the to-be-inserted audio segment, generating the updated target audio clip based on the to-be-inserted audio segment, the target audio clip, and the to-be-inserted audio location, and generating the updated target text information based on the to-be-inserted text information, the corresponding target text information, and the to-be-inserted text location; and displaying the updated target audio clip and the updated target text information in the graphical user interface.

14. The non-transitory computer-readable storage medium according to claim 13, wherein the updated target text information comprises second text information and third text information, the second text information is displayed before the, and the third text information is displayed after the first text information; using text information obtained after the first text information is deleted as updated target text information comprises:

performing concatenation processing on the second text information and the third text information, and using text information obtained after the concatenation processing as the updated target text information;

the audio obtained after the first audio segment is deleted comprises a second audio segment before the first audio segment, and a third audio segment that is after the first audio segment; and using audio obtained after the first audio segment is deleted as the updated audio clip comprises:

performing synthesis processing on the second audio segment and the third audio segment, and using audio obtained after the synthesis processing as the updated target audio clip.

15. The non-transitory computer-readable storage medium according to claim 13, wherein the operations further comprise:

prior to deleting, in response to the deletion confirmation instruction, the first text information in the corresponding target text information at the to-be-processed text location, and deleting the first audio segment in the target audio clip:

highlighting the first text information in the target text information, and highlighting the first audio segment in the target audio clip.

16. The non-transitory computer-readable storage medium according to claim 13, wherein generating the updated target audio clip based on the to-be-inserted audio segment, the target audio clip, and the to-be-inserted audio location comprises:

placing the to-be-inserted audio segment between a fourth audio segment of the target audio clip and a fifth audio segment of the target audio clip;

performing synthesis processing on the fourth audio segment, the to-be-inserted audio segment, and the fifth audio segment in an arrangement order to generate the updated target audio clip;

and wherein generating the updated target text information based on the to-be-inserted text information, the corresponding target text information, and the to-be-inserted text location comprises:

placing the to-be-inserted text information between fourth text information associated with the fourth audio segment and a fifth text information associated with the fifth audio segment, performing concatenation processing on the fourth text information, the to-be-inserted text information, and the fifth text information in an arrangement order to obtain the updated target text information.

17. The non-transitory computer-readable storage medium according to claim 13, wherein the operations further comprise:

after determining the to-be-inserted text location and the to-be-inserted audio location, displaying a cursor with a target attribute at the to-be-inserted text location; and moving the to-be-inserted audio location to a locating pointer.

18. The non-transitory computer-readable storage medium according to claim 13, wherein the using, as a to-be-processed text location, a location of text information that is in the target text information and that matches a location selection instruction, and using, as a to-be-processed audio location, a location of an audio segment that has the mapping relationship with the to-be-processed text location comprises: using, as a to-be-processed text location in response to a location selection instruction for the target text information, a location of text information that is in the target text information and that matches a location selection instruction, and using, as a to-be-processed audio location, a location of an audio segment that has the mapping relationship with the to-be-processed text location; the location selection instruction comprises an insertion selection instruction; and before the acquiring a to-be-inserted audio segment and to-be-inserted text information corresponding to the to-be-inserted audio segment in response to the audio insertion instruction of the to-be-inserted audio location, the method further comprises:

displaying an audio recording control in response to obtaining the insertion selection instruction of the target text information; and obtaining an audio insertion instruction of the to-be-inserted audio location based on a trigger operation performed by the interaction object on the audio recording control.

19. The non-transitory computer-readable storage medium according to claim 18, wherein the target text information comprises a spacing formed by text, and before the displaying an audio recording control in response to obtaining the insertion selection instruction of the target text information, the method further comprises:

displaying an insert control on a display page displaying the target audio clip and the target text information;

displaying, based on a trigger operation of an interaction object on a spacing of the target text information, a cursor with a default attribute at a location of the spacing; the default attribute being different from the target attribute; and obtaining an insertion selection instruction of the target text information in response to detecting a locating operation performed by the interaction object on the cursor with the default attribute and a trigger operation performed on the insert control.

20. The non-transitory computer-readable storage medium according to claim 13, wherein the operations further comprise:

prior to displaying target audio and target text information corresponding to the target audio:

acquiring the target audio clip based on a processing request for the target audio clip;

performing text conversion processing on the target audio clip to obtain the target text information corresponding to the target audio clip; and determining, based on the target audio clip and the target text information, a mapping relationship between a location of an audio segment in the target audio clip and a location of text information in the target text information.

* * * * *